(12) United States Patent
Shima et al.

(10) Patent No.: US 9,472,157 B2
(45) Date of Patent: Oct. 18, 2016

(54) LIQUID CRYSTAL DISPLAY DEVICE

(71) Applicant: TOPPAN PRINTING CO., LTD., Tokyo (JP)

(72) Inventors: Yasuhiro Shima, Tokyo (JP); Hisashi Nakada, Tokyo (JP); Kenzo Fukuyoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/516,994

(22) Filed: Oct. 17, 2014

(65) Prior Publication Data

US 2015/0035872 A1   Feb. 5, 2015

Related U.S. Application Data

(63) Continuation of application No. PCT/JP2013/057886, filed on Mar. 19, 2013.

(30) Foreign Application Priority Data

Apr. 18, 2012  (JP) ................. 2012-094960

(51) Int. Cl.
  *G09G 3/36* (2006.01)
  *G02F 1/1335* (2006.01)
  (Continued)

(52) U.S. Cl.
  CPC .............. *G09G 3/3696* (2013.01); *G02F 1/137* (2013.01); *G02F 1/1368* (2013.01);
  (Continued)

(58) Field of Classification Search
  CPC ................... G02F 1/13306; G02F 1/133512; G02F 1/133514; G02F 1/133615; G02F 1/133707; G02F 1/134336; G02F 1/13439; G02F 2001/133607; G02F 2001/13712; G09G 3/3607; G09G 3/3696; H04N 13/0404; H04N 13/0422

USPC ...................... 345/88, 92, 102, 690
See application file for complete search history.

(56) References Cited

U.S. PATENT DOCUMENTS

2005/0073625 A1   4/2005  Daiku et al.
2005/0099578 A1   5/2005  Kim et al.
(Continued)

FOREIGN PATENT DOCUMENTS

CN    102067011 A    5/2011
CN    102279469 A    12/2011
(Continued)

OTHER PUBLICATIONS

Feng, Xiao-fan, "LCD motion-blur analysis, perception, and reduction using synchronized backlight flashing," *Proceedings of SPIE-IS&T Electronic Imaging*, Society of Photo-Optical Instrumentation Engineers, vol. 6057, Jan. 2006.
(Continued)

*Primary Examiner* — Viet Pham

(57) ABSTRACT

A device according to an embodiment includes an array substrate including electrodes corresponding to pixels arranged in a matrix, a color filter substrate opposed to the array substrate and including color filters corresponding to the pixels, a liquid crystal layer provided between the substrates, a backlight, and a controller which controls the substrates and the backlight. The pixels are configured to each have a parallelogrammatic shape elongated in a lateral direction, such that identical colors are arranged in the lateral direction, and different colors are arranged in a vertical direction. Pixels neighboring in the lateral direction are in line-symmetry with respect to a center line of the neighboring pixels. Liquid crystal molecules have negative dielectric constant anisotropy, and rotate horizontally relative to a substrate plane in a direction of the line-symmetry with respect to the center line when the voltage is applied to the electrodes of the neighboring pixels.

8 Claims, 17 Drawing Sheets

(51) Int. Cl.
*H04N 13/04* (2006.01)
*G02F 1/133* (2006.01)
*G02F 1/1343* (2006.01)
*G02F 1/1368* (2006.01)
*G02F 1/137* (2006.01)
*G02F 1/1337* (2006.01)
*G02F 1/29* (2006.01)

(52) U.S. Cl.
CPC ...... *G02F 1/13306* (2013.01); *G02F 1/13439* (2013.01); *G02F 1/133512* (2013.01); *G02F 1/133514* (2013.01); *G02F 1/133615* (2013.01); *G02F 1/133707* (2013.01); *G02F 1/134336* (2013.01); *G02F 1/134363* (2013.01); *G02F 1/292* (2013.01); *G09G 3/3607* (2013.01); *H04N 13/0404* (2013.01); *H04N 13/0454* (2013.01); *H04N 13/0468* (2013.01); *G02F 2001/13712* (2013.01); *G02F 2001/133607* (2013.01); *H04N 13/0422* (2013.01)

(56) References Cited

U.S. PATENT DOCUMENTS

| | | | |
|---|---|---|---|
| 2006/0125774 | A1 | 6/2006 | Nishigaki |
| 2009/0015768 | A1 | 1/2009 | Igeta et al. |
| 2009/0316058 | A1 | 12/2009 | Huizinga et al. |
| 2010/0182152 | A1* | 7/2010 | Andersson ............ A61B 3/113 340/573.1 |
| 2011/0018909 | A1 | 1/2011 | Ota et al. |
| 2011/0304612 | A1 | 12/2011 | Ohyama |
| 2013/0002974 | A1 | 1/2013 | Minato et al. |
| 2013/0083264 | A1 | 4/2013 | Hagiwara et al. |

FOREIGN PATENT DOCUMENTS

| | | |
|---|---|---|
| EP | 2 426 401 A1 | 3/2012 |
| EP | 2 584 399 A1 | 4/2013 |
| JP | 2005-10721 | 1/2005 |
| JP | 2006-164842 | 6/2006 |
| JP | 3930021 | 6/2007 |
| JP | 4010564 | 11/2007 |
| JP | 2008-175857 | 7/2008 |
| JP | 2008-249887 | 10/2008 |
| JP | 2009-3002 | 1/2009 |
| JP | 4213226 | 1/2009 |
| JP | 2010-506214 | 2/2010 |
| JP | 2010-524047 | 7/2010 |
| JP | 2010-541019 | 12/2010 |
| JP | 2010-541020 | 12/2010 |
| JP | 4655465 | 3/2011 |
| JP | 2012-32533 | 2/2012 |
| KR | 10-2005-0033470 | 4/2005 |
| KR | 10-2005-0044952 | 5/2005 |
| KR | 10-2005-0083433 | 8/2005 |
| KR | 10-2009-0006754 | 1/2009 |
| KR | 10-2011-0017918 | 2/2011 |
| KR | 10-2011-0135340 | 12/2011 |
| RU | 2 231 828 C2 | 6/2004 |
| WO | WO 2011/148706 A1 | 12/2011 |
| WO | WO 2011/158671 A1 | 12/2011 |

OTHER PUBLICATIONS

Extended European Search Report mailed Mar. 18, 2015 in corresponding European Patent Application No. 13778382.5.
Korean Office Action dated Nov. 20, 2015 in corresponding Korean Patent Application No. 10-2014-7029184.
International Search Report mailed Apr. 16, 2013, in corresponding International Patent Application No. PCT/JP2013/057886.
International Preliminary Report on Patentability mailed Dec. 18, 2014 in corresponding International Patent Application No. PCT/JP2013/057886.
Chinese Office Action dated Apr. 1, 2016 in corresponding Chinese Patent Application No. 201380020565.X.
European Office Action dated Feb. 29, 2016 in corresponding European Patent Application No. 13778382.5.

* cited by examiner

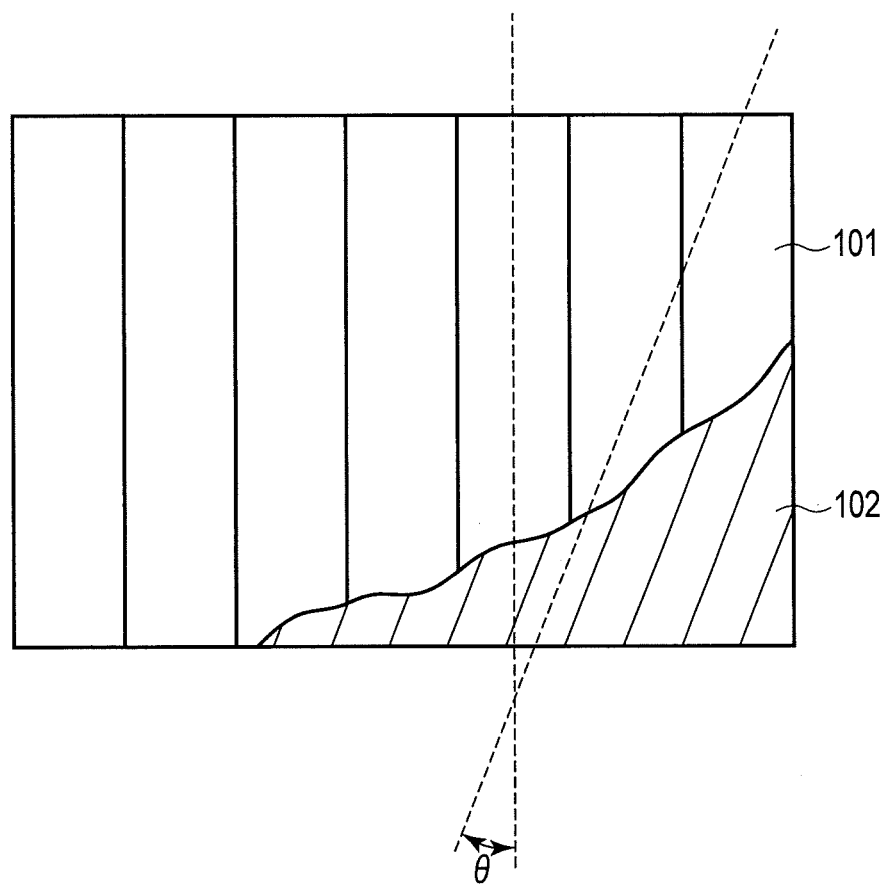
F I G. 2

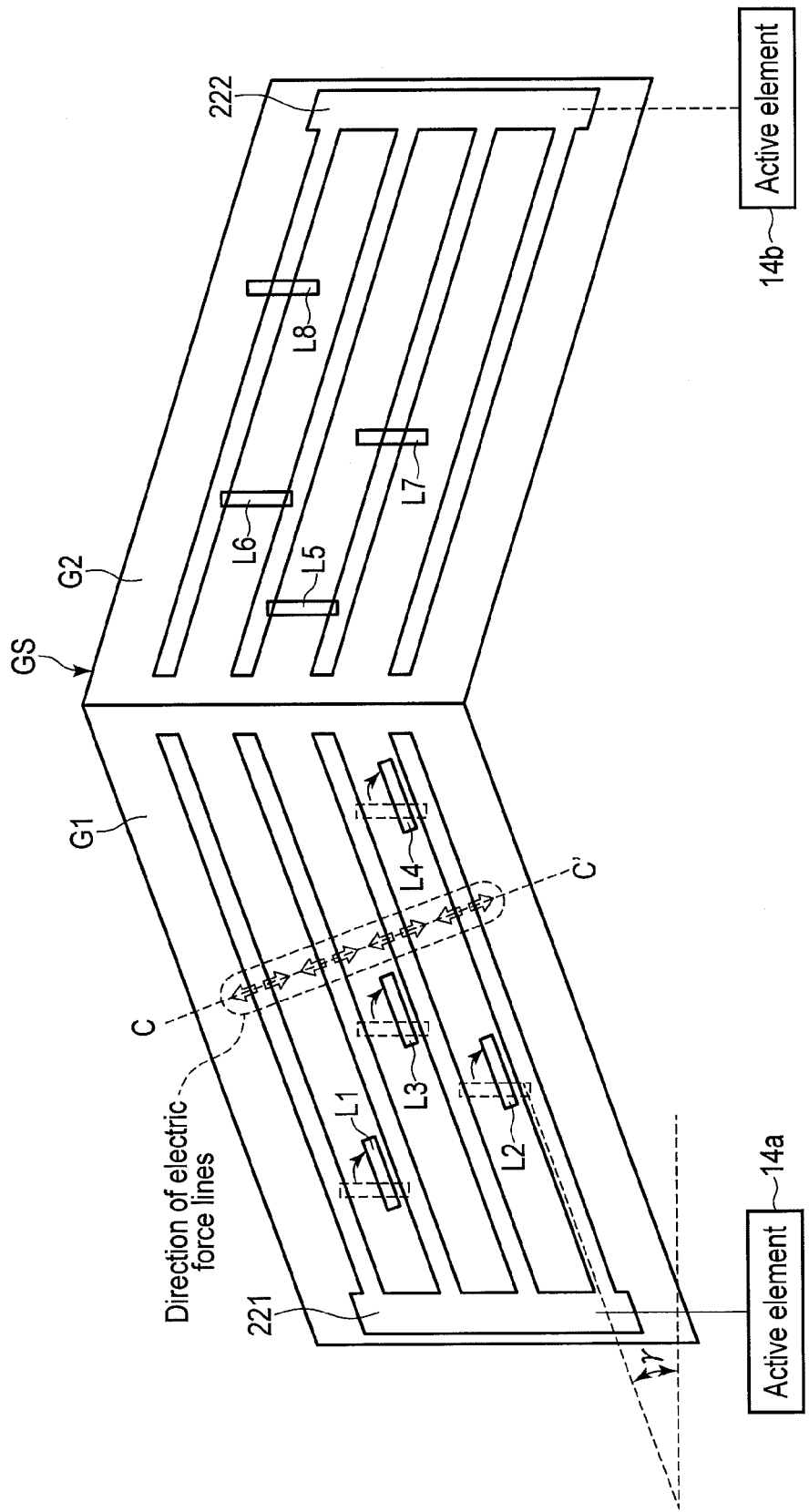
F I G. 9

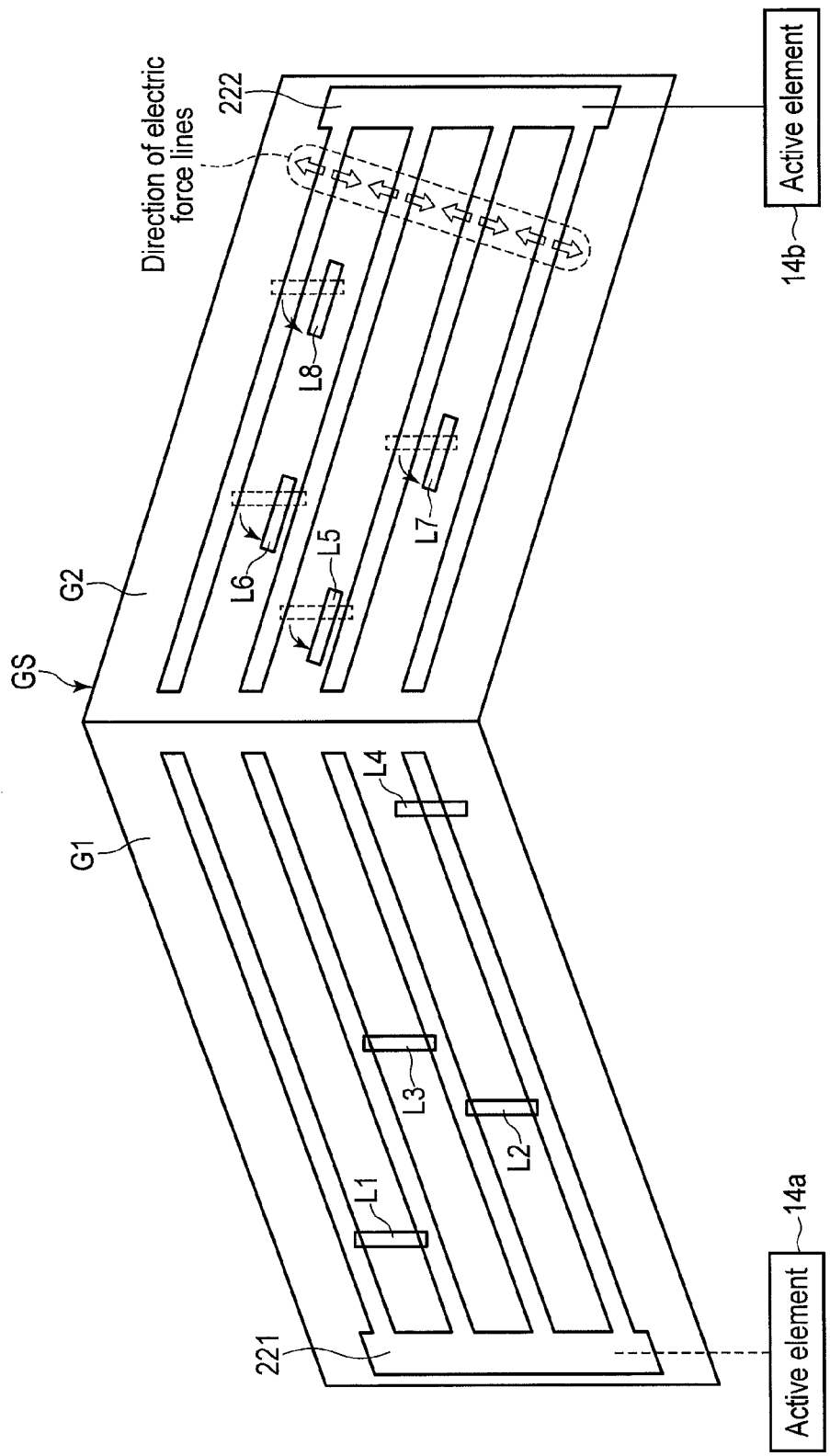
F I G. 11

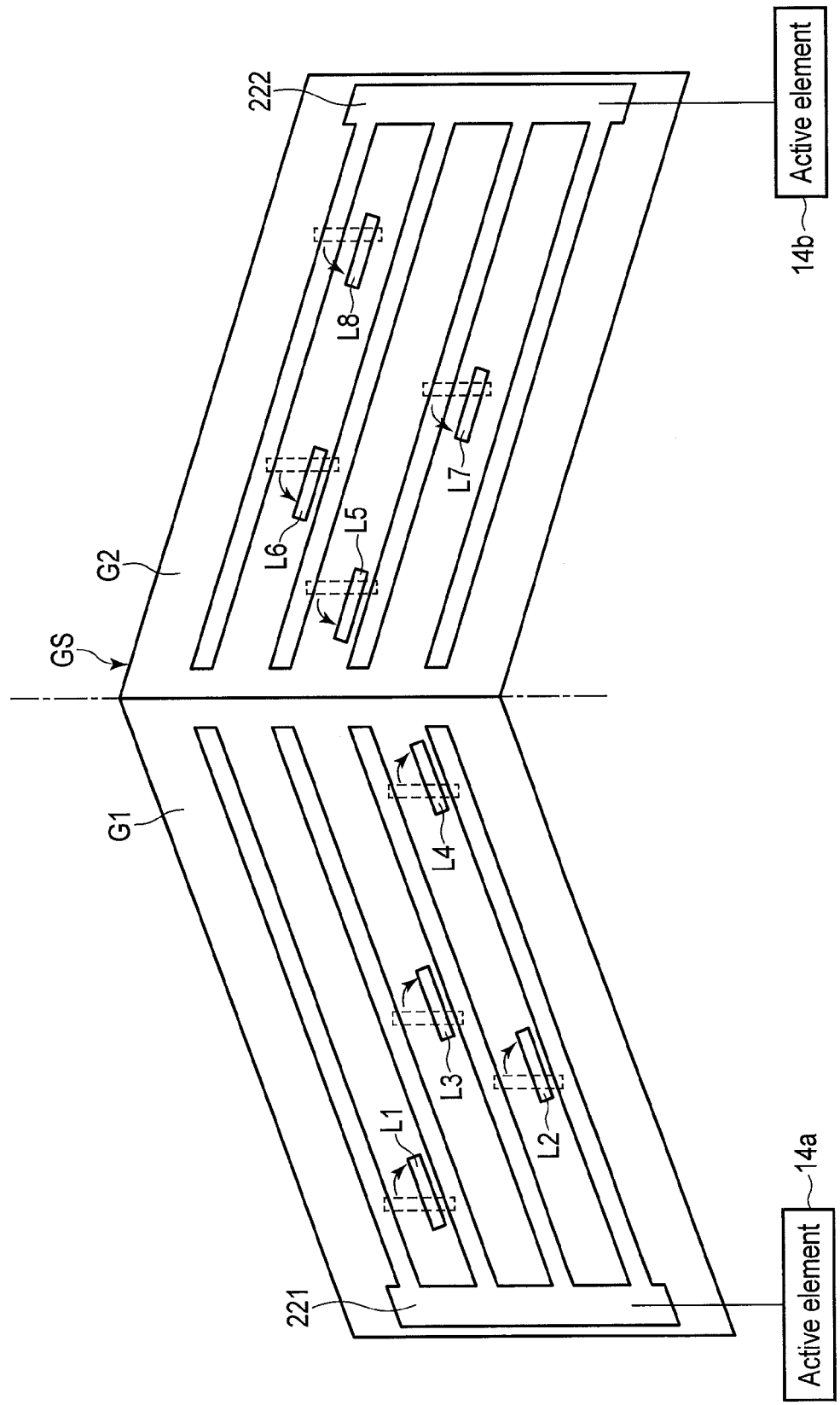
F I G. 12

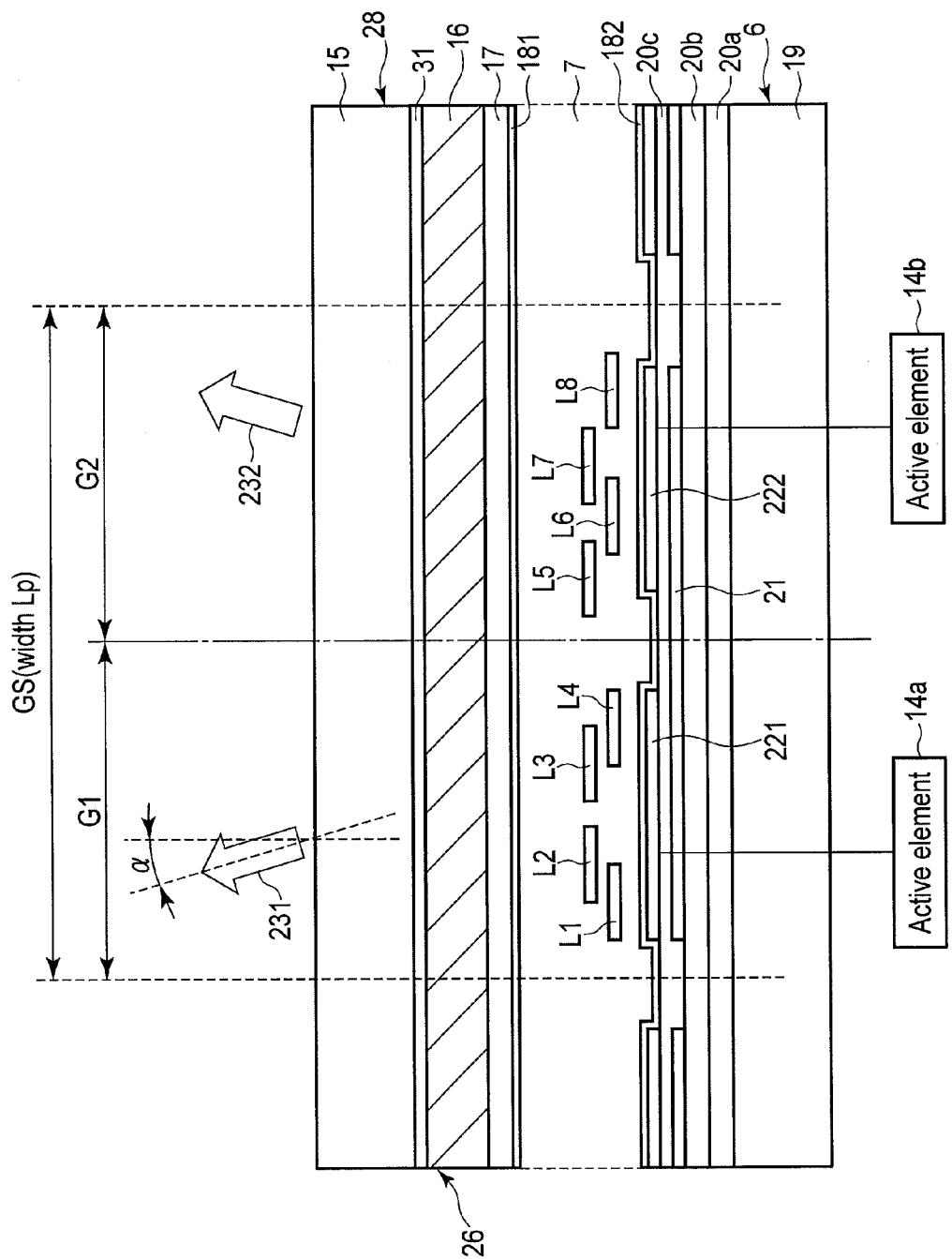
F I G. 14

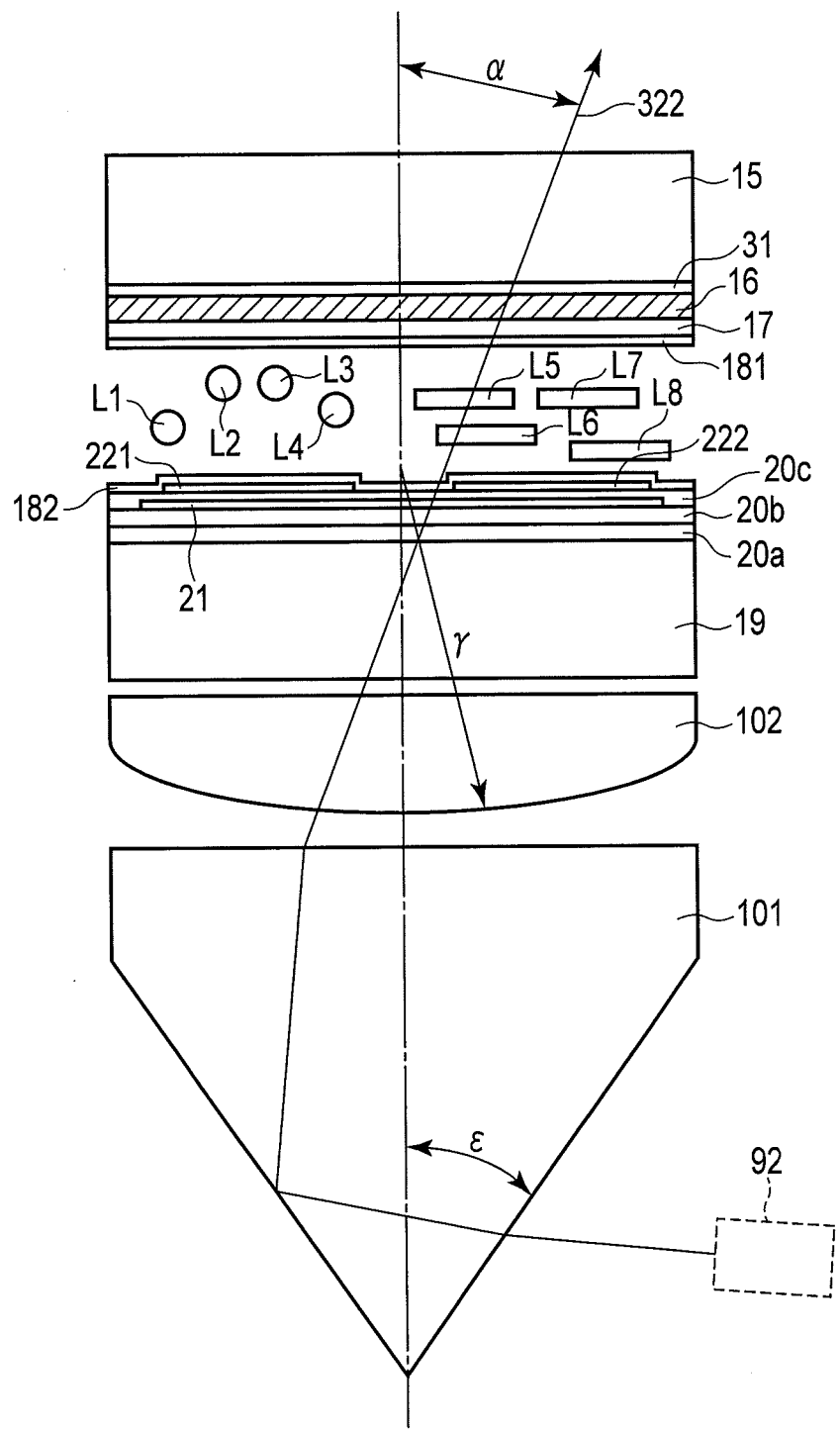
F I G. 16

LIQUID CRYSTAL DISPLAY DEVICE

CROSS-REFERENCE TO RELATED APPLICATIONS

This application is Continuation application of PCT Application No. PCT/JP2013/057886, filed Mar. 19, 2013 and based upon and claiming the benefit of priority from the Japanese Patent Application No. 2012-094960, filed Apr. 18, 2012, the entire contents of all of which are incorporated herein by reference.

BACKGROUND OF THE INVENTION

1. Field of the Invention

The present invention relates to a liquid crystal display device.

2. Description of the Related Art

A liquid crystal cell of a general liquid crystal display device has a structure in which a liquid crystal layer is held by transparent substrates such as glass substrates. The liquid crystal display device includes a liquid crystal panel configured such that a polarizer, or a polarizer and a retardation plate, are disposed on the front and back of the liquid crystal cell.

In a first example, a liquid crystal display device includes a backlight unit as a light source on a back surface of a liquid crystal panel, which is on a side opposite to an observer. In a second example, a liquid crystal display device makes use of an external light source such as room light, in addition to a backlight unit.

In a liquid crystal display device which is capable of performing three-dimensional image display, and a liquid crystal display device which is capable of controlling a viewing angle, a liquid crystal panel which makes use of a backlight unit or an external light source is configured to control, according to purposes of display, an emission angle of light which is emitted to the outside from a front surface of the liquid crystal panel, which is on an observer side.

Various display methods are known for liquid crystal display devices, or display devices, which are capable of performing three-dimensional image display. These display methods include methods using glasses, and methods not using glasses. The methods using glasses include an anaglyph method which makes use of a difference in color, or a polarization-glasses method which makes use of polarization. In the method of using glasses, it is necessary for an observer to wear purpose-specific glasses at a time of three-dimensional image display, and this is troublesome. In recent years, there has been an increasing demand for methods which require no glasses.

In order to adjust the angle of light which is emitted from the liquid crystal panel to a single observer or plural observers (hereinafter, in some cases, "single observer" and "plural observers" are referred to as "two-view type" and "multi-view type", respectively), a study has been made of a technique of providing an optical control element on the front surface or back surface of the liquid crystal panel.

There is a case in which the optical control element is used in a liquid crystal display device which is capable of performing three-dimensional image display and requires no glasses.

An example of the optical control element is a lenticular lens which is configured such that optical lenses are arranged two-dimensionally, and realizes regular refraction. The lenticular lens is used such that a transparent resin or the like is processed in a sheet shape and attached to the front surface or back surface of a liquid crystal display device. Patent document 1 (Japanese Patent No. 4010564) and patent document 2 (Japanese Patent No. 4213226) disclose three-dimensional image display techniques using lenticular lenses (lenticular screens). Prism sheets including convex lenses are disclosed in patent documents 3 to 8 (Jpn. Pat. Appln. KOKAI Publication No. 2010-506214, Jpn. Pat. Appln. KOKAI Publication No. 2010-524047, Jpn. Pat. Appln. KOKAI Publication No. 2010-541019, Jpn. Pat. Appln. KOKAI Publication No. 2010-541020, Japanese Patent No. 4655465, and Japanese Patent No. 3930021).

The relationship between various arrangements of pixels (color pixels) of color filters and light-ray control elements (lenticular sheets) including aperture portions in a direction of the arrangement is disclosed in patent document 9 (Jpn. Pat. Appln. KOKAI Publication No. 2008-249887).

In addition, a technique of successively disposing color filters of the same color in a lateral direction is disclosed, for example, in Claim 1 of patent document 10 (Jpn. Pat. Appln. KOKAI Publication No. 2009-3002).

BRIEF SUMMARY OF THE INVENTION

In the above-described patent documents 1-8, lenticular lenses are used. Patent document 1 discloses a technique in which a display element (a pixel or a sub-pixel) is formed in a parallelogrammatic shape or a triangular shape, or a display element is disposed with an offset, thereby substantially providing an angle between a pixel (or a sub-pixel) array and a lenticular screen. Patent document 1, like patent document 2, discloses a technique of giving a successive (smooth) horizontal parallax to an observer. In patent document 1, there is a case in which aliasing occurs in display due to a substantially obliquely disposed pixel array and an edge of the lenticular screen crossing this pixel array. Patent document 1 discloses, for example, neither a technique of optimizing an alignment direction, in which liquid crystal molecules become line-symmetric, by using a three-dimensional optical control element, nor a technique of associating a triangular prism and a laterally elongated pixel, and effecting switching between a three-dimensional image and a two-dimensional image. Nor does patent document 1 disclose a technique of using liquid crystal molecules with a negative dielectric constant anisotropy in a liquid crystal display device for three-dimensional image display.

Patent document 2 discloses a technique in which an offset angle is provided between a major axis of a lenticular screen and a pixel array. In patent document 2, a loss in resolution of three-dimensional image display is reduced by a lenticule to which an offset angle is given, and smooth display is provided even when the head of the observer moves (the screen is smoothly switched). However, in patent document 2, since the edge of the obliquely disposed lenticular screen crosses the pixel array, there is a case in which aliasing occurs in display. Patent document 2 discloses, for example, neither a technique of optimizing a relationship between an alignment direction, in which liquid crystal molecules become line-symmetric, and a three-dimensional optical control element, nor a technique of associating a triangular prism and a laterally elongated pixel, and effecting switching between a three-dimensional image and a two-dimensional image. Nor does patent document 2 disclose a technique of using liquid crystal molecules with a negative dielectric constant anisotropy in a liquid crystal display device for three-dimensional image display.

In patent documents 3 to 6, a liquid crystal of an optically compensated bend (OCB) mode is applied to three-dimensional image display. In patent documents 3 to 6, OCB is explained merely from the standpoint of a response time of a liquid crystal, which is necessary for three-dimensional image display. However, none of patent documents 3 to 6 discloses a liquid crystal display device which optimizes light distribution by liquid crystal molecules per se, which are used in a liquid crystal panel, and enables bright three-dimensional image display and two-dimensional image display. For example, none of patent documents 3 to 6 discloses in which direction OCB liquid crystal molecules are to be arranged with respect to a light distribution angle of a light source for a right-eye image and a light distribution angle of a light source for a left-eye image, thereby to optimize three-dimensional image display for the right eye and left eye. In addition, there is a case in which the OCB liquid crystal has a lower viewing-angle characteristic than IPS (a liquid crystal panel of a lateral electric field using horizontally aligned liquid crystal molecules) or VA (a liquid crystal panel of a vertical electric field using vertically aligned liquid crystal molecules). The OCB liquid crystal requires, each time the panel is activated, a transition operation from a splay alignment, which is an initial alignment, to a bend alignment at a time of driving. Thus, there is a case in which the OCB liquid crystal is not preferable for a liquid crystal display device for small-sized mobile equipment.

Each of patent documents 3 to 7 discloses a double-surface prism sheet having a cross-sectional shape as disclosed in patent document 8. A liquid crystal display device of each of patent documents 3 to 7 performs three-dimensional image display by using light sources provided on both sides of the backlight unit. However, like patent document 8, none of patent documents 3 to 7 discloses a measure for eliminating moiré due to interference between the prism sheet and the liquid crystal panel, which tends to occur in three-dimensional image display. Furthermore, none of patent documents 3 to 7 discloses a liquid crystal display device which optimizes light distribution by liquid crystal molecules per se, which are provided in a liquid crystal panel, and enables bright three-dimensional image display and two-dimensional image display.

Patent document 8 discloses a double-surface prism sheet which includes a cylindrical lens row that is parallel to a triangular prism row, with a focus position of the cylindrical lens agreeing with an apex of the prism. FIG. 1 or FIG. 2 of patent document 8 illustrates a technique of effecting three-dimensional image display by using this double-surface prism sheet and both-side light sources provided on the backlight unit. However, in the technique of patent document 8, it is difficult to eliminate moiré due to interference between the cylindrical lens row and the liquid crystal panel, which tends to occur in three-dimensional image display. In addition, patent document 8 does not disclose a liquid crystal display device which optimizes light distribution by liquid crystal molecules per se, which are used in the liquid crystal panel, and enables bright three-dimensional image display and two-dimensional image display. Patent document 8 neither takes into account the matching between a color filter, which is generally used in a color liquid crystal display device, and the double-surface prism sheet, nor discloses the relationship in correspondency between the double-surface prism sheet and laterally elongated pixel. Furthermore, patent document 8 does not disclose optimization from the standpoint of the alignment of liquid crystal molecules used in the liquid crystal panel or the liquid crystal operation.

Patent document 9 discloses a combination between a light-ray control element, which is a lenticular sheet, and various arrangements of color pixels. However, patent document 9 does not disclose a liquid crystal display device in which elongated color pixels are formed in a direction in which the two eyes of the observer are disposed, one active element is provided in one color pixel, and, when a liquid crystal layer is driven by active elements of neighboring color pixels, tilt directions of liquid crystal molecules become line-symmetric between laterally neighboring pixels, with respect to the center axis in the vertical direction of the two neighboring pixels. In addition, patent document 9 does not disclose a technique in which a picture element at a time of three-dimensional image display is composed of two red pixels, two green pixels and two blue pixels. Besides, patent document 9 does not disclose a liquid crystal display device including, on that surface of an array substrate which is opposite to a liquid crystal layer, an edge-lit-type light guide including a solid-state light-emission element array, and a unit for causing the solid-state light-emission element to emit light by applying a voltage to the solid-state light-emission element in synchronism with a video signal and an operation of liquid crystal molecules.

Patent document 10 discloses a technique in which color elements (color pixels) of the same color are arranged in a long-side direction of a display area and the color elements are arranged in stripes. However, patent document 10 does not disclose a technique of displaying a three-dimensional image by using a lenticular lens, for example, by using a liquid crystal alignment which is line-symmetric with respect to the long-side direction. Patent document 10 neither takes into account the synchronism with the solid-state light-emission element and the video signal, nor relates to a three-dimensional image display technique.

As regards the display of a three-dimensional image, an improvement in display quality is desired. However, none of patent documents 1 to 10 discloses a technique of line-symmetry driving the liquid crystal layer by active elements, the laterally elongated pixels agreeing with the direction in which the two eyes of the observer are disposed and the driving of the liquid crystal, or the optimal configuration of the lenticular lens and the solid-state light-emission element.

The present invention has been made in consideration of the above circumstances, and the object of the invention is to provide a liquid crystal display device for eliminating moiré which is incidental to three-dimensional image display, and for more brightly and effectively realizing three-dimensional display and two-dimensional display.

In the embodiment, a liquid crystal display device includes an array substrate, a color filter substrate, a liquid crystal layer, a backlight, and a controller. The array substrate includes a plurality of pixel electrodes corresponding to a plurality of pixels arranged in a matrix. The color filter substrate is opposed to the array substrate and includes color filters corresponding to the plurality of pixels. The liquid crystal layer is provided between the array substrate and the color filter substrate. The backlight unit is provided on a back surface side of the array substrate, the back surface side being opposite to a liquid crystal layer side of the array substrate. The controller is configured to control an application timing of a liquid crystal driving voltage to the pixel electrodes, and a light emission timing of the backlight unit. The plurality of pixels are configured to each have a plan-view shape of a parallelogram which is elongated in a lateral direction, and configured such that identical colors are arranged in the lateral direction, and different colors are arranged in a vertical direction. Pixels neighboring in the lateral direction of the plurality of pixels have shapes of line-symmetry with respect to a center line of the neighboring pixels. Liquid crystal molecules of the neighboring pixels have a negative dielectric constant anisotropy, and, when the liquid crystal driving voltage is applied to the pixel electrodes corresponding to the neighboring pixels, the liquid crystal molecules rotate horizontally relative to a substrate plane in a direction of the line-symmetry with respect to the center line.

Advantageous Effects of Invention

In the embodiment of the invention, display non-uniformity such as moiré can be eliminated, a three-dimensional image with a high display quality can be displayed, three-dimensional display and two-dimensional display can be switched, and three-dimensional display and two-dimensional display can be more brightly and effectively realized.

BRIEF DESCRIPTION OF THE SEVERAL VIEWS OF THE DRAWINGS

FIG. 2 is a plan view illustrating an example of a cylindrical lens and a triangular prism of an optical control element according to the first embodiment.

FIG. 9 is a plan view illustrating an example of a liquid crystal operation at a time when a liquid crystal driving voltage is applied to a pixel electrode of one of two neighboring pixels.

FIG. 11 is a plan view illustrating an example of the liquid crystal operation at a time when a liquid crystal driving voltage is applied to a pixel electrode of the other of the two neighboring pixels.

FIG. 12 is a plan view illustrating an example of the liquid crystal operation at a time when a liquid crystal driving voltage is applied to the pixel electrodes of the two neighboring pixels.

FIG. 14 is a cross-sectional view illustrating an example of the liquid crystal display device according to the second embodiment.

FIG. 16 is a cross-sectional view illustrating an example of synchronization between a pixel electrode of the other of two neighboring pixels and a solid-state light emission element.

DETAILED DESCRIPTION OF THE INVENTION

Figure 1:
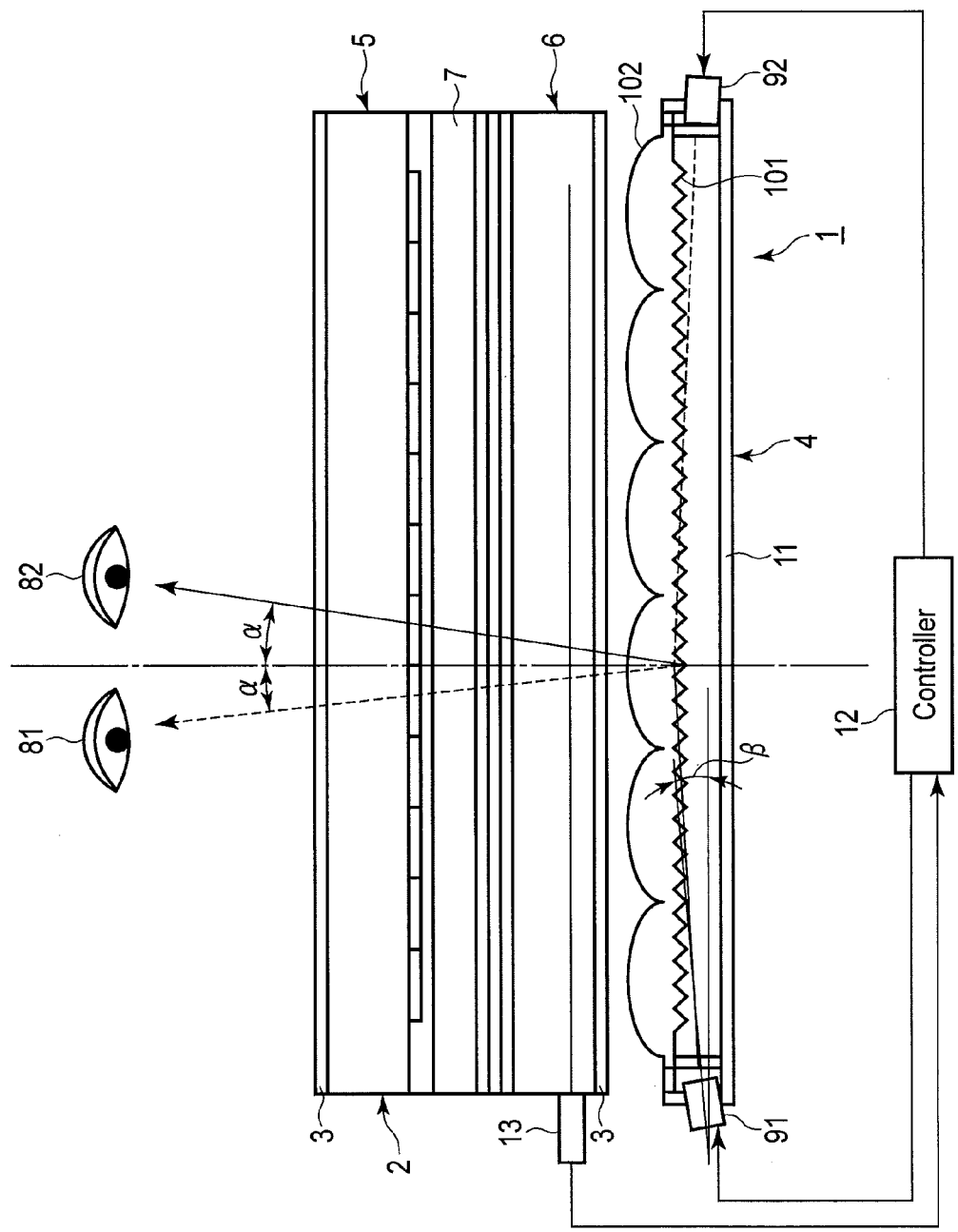
FIG. 1 is a cross-sectional view illustrating an example of a liquid crystal display device according to a first embodiment.

Embodiments of the invention will be described hereinafter with reference to the accompanying drawings. In the description below, identical or substantially identical functions and structural elements are denoted by like reference numerals, and a description thereof is omitted, or a description is given only where necessary.

In the embodiments below, only characteristic parts will be described, and a description is omitted of parts which are not different from structural elements of ordinary liquid crystal display devices.

In the embodiments below, a pixel may be a sub-pixel. By way of example, a display unit of a liquid crystal display device is assumed to be a picture element which is composed of six pixels including two red pixels, two green pixels and two blue pixels. However, the number of pixels included in the picture element may be freely changed.

In the embodiments below, a direction of arrangement of pixels, which is parallel to a direction of disposition of the right and left eyes of an observer is defined as a lateral direction, and a direction of arrangement of pixels, which is perpendicular to this lateral direction, is defined as a vertical direction.

A color pixel has a shape which is long in the lateral direction. In the description below, there is a case in which the lateral direction is described as a pixel longitudinal direction. The color pixel has a shape which is short in the vertical direction. In the description below, there is a case in which the vertical direction is described as a pixel transverse direction.

In the description below, there is a case in which two pixels of the same color are described as a pair. In addition, in the picture element including six pixels, it is assumed that two pixels of the same color are arranged in the lateral direction, and pixels of three different colors are arranged in the vertical direction.

First Embodiment

FIG. 1 is a cross-sectional view illustrating an example of a liquid crystal display device according to the embodiment. FIG. 1 shows a cross section in the lateral direction.

A liquid crystal display device 1 includes, as basic structural elements, a liquid crystal panel 2, polarizers 3, a backlight unit 4, and a controller 12. The polarizer 3 may be formed by attaching a retardation plate.

In each of the embodiments below, a pair of polarizers 3 may be configured as crossed Nicols. In addition, the absorption axes of the paired polarizers 3 may be made parallel, and the liquid crystal display device 1 may include a spiral element between one of the polarizers 3 and the liquid crystal panel 2, the spiral element being configured to convert first linearly polarized light of this one of the polarizers 3 to second linearly polarized light which is perpendicular to the first linearly polarized light.

The liquid crystal panel 2 includes a color filter substrate 5, an array substrate 6 and a liquid crystal layer 7. The color filter substrate 5 and the array substrate 6 are opposed to each other. The liquid crystal layer 7 is interposed between the color filter substrate 5 and the array substrate 6.

In the present embodiment, a plurality of pixels are disposed in a matrix.

The liquid crystal panel 2 includes red pixels, green pixels and blue pixels. In the embodiment, each pixel has a parallelogrammatic shape which is longer in the lateral direction than in the vertical direction, when viewed in plan.

The lateral direction, as described above, is the direction in which the right eye 81 and left eye 82 of the observer are disposed. In the embodiment, it is assumed that neighboring pixels of the same color are arranged in the lateral direction (a horizontal direction in a lateral-directional cross section of FIG. 1). The polarizers 3, retardation plates (not shown), etc. are provided on a front surface (a plane on the observer side) side and a back surface (a plane on a side opposite to the observer) side of the liquid crystal panel 2.

The backlight unit 4 is provided on the back surface of the liquid crystal panel 2 (the back surface side of the array substrate 6, which is opposite to the liquid crystal layer 7 side) via the polarizer 3. The backlight unit 4 includes, as basic structural elements, solid-state light emission elements 91, 92, such as LEDs (light-emitting diodes), an optical control element 101 which is an array of triangular prisms, an optical control element 102 which is an array of cylindrical lenses, and a reflection plate 11.

The array of cylindrical lenses shown in FIG. 1 has a longitudinal (longer-side) direction in a direction perpendicular to the lateral-directional cross section of FIG. 1. The optical control element 101, which is the array of triangular prisms, and the optical control element 102, which is the array of cylindrical lenses, may be formed of an acrylic resin or the like, and may be formed as an integral molded article of back-to-back attachment.

The pitch of the array of triangular prisms and the pitch of the array of cylindrical lenses may be in a relationship of 1:1, or, as illustrated in FIG. 1, the pitch of the array of triangular prisms may be set to be finer than the pitch of the array of cylindrical lenses.

As illustrated in FIG. 2, an angle θ is provided between a longitudinal axis of the cylindrical lens and a longitudinal axis of the triangular prism.

The plural triangular prisms have an angle θ to the vertical direction. The plural triangular prisms are arranged with a fine pitch. The angle θ may be set in a range of, e.g. 3° to 42°. The angle θ may be greater than this range. The angle θ is set at such an angle as not to interfere with the optical axis of the polarizer or liquid crystal alignment.

The backlight unit 4 may include, for example, a diffusion plate, a light guide plate, a polarization split film, and a retroreflection polarization element, but these components are omitted in FIG. 1.

The solid-state light emission element 91, 92 may be, for instance, a white LED which emits white light including three wavelengths of red, green and blue in the light emission wavelength range. The solid-state light emission element 91, 92 may be, for instance, a pseudo-white LED in which a GaN-based blue LED and a YAG-based phosphor material are combined. In order to enhance color rendering properties, an LED with a major peak of one color or more, such as a red LED, may be used together with a pseudo-white LED. For example, use may be made of a light source in which red and green phosphors are stacked on a blue LED.

The backlight unit 4 may include a plurality of solid-state light emission elements 91 and a plurality of solid-state light emission elements 92. In this case, the plurality of solid-state light emission elements 91 and the plurality of solid-state light emission elements 92 may include LEDs which individually emit any one of red, green and blue. The plurality of solid-state light emission elements 91 and the plurality of solid-state light emission elements 92 may include LEDs which emit light of an ultraviolet range, or may include LEDs of an infrared range.

The controller 12 executes various control processes in the liquid crystal display device 1. For example, the controller 12 controls the timing of application of a liquid crystal driving voltage to pixel electrodes 221, 222, and the timing of light emission of the backlight unit 4. For example, the controller 12 realizes three-dimensional image display by synchronizing and controlling the timing of light emission of the solid-state light emission elements 91, 92, and the timing of application of a driving voltage of the liquid crystal layer 7, based on a right-eye video signal and a left-eye video signal.

In the meantime, the liquid crystal display device 1 may include a light reception element 13. In this case, the light reception element 13 is used for data input by an optical sensor. For example, the light reception element 13 detects specific-wavelength light which is emitted from a light emission element such as an ultraviolet-range or infrared-range LED. The controller 12 detects a position of the light-reception element 13, where specific-wavelength light has been detected. In addition, for example, based on the light detected by the light reception element 13, the controller 12 detects the position of the observer or the position of a pointer such as a finger. The light reception element 13 may be an oxide semiconductor active element with a transparent channel layer formed of a composite metal oxide, or may be capable of detecting light of the ultraviolet range. The light reception element 13 may be an image-pickup element (camera) such as a CMOS or CCD, which is mounted on the housing of the liquid crystal display device. This light reception element 13 may be used for biometrics authentication or personal authentication, in addition to touch sensing and image pickup. In addition, the light reception element 13 may be, for example, a plurality of optical sensors which are provided in a matrix on the array substrate 6.

The controller 12 detects, for example, the position of the observer, based on an output value of the light reception element 13, and adjusts an emission angle β of emission light from the solid-state light emission element 91, 92, based on the position of the observer. Thereby, an emission angle α to the two eyes (right eye 81 and left eye 82) of the observer can be adjusted, and the visibility of a three-dimensional image can be improved.

Figure 3:
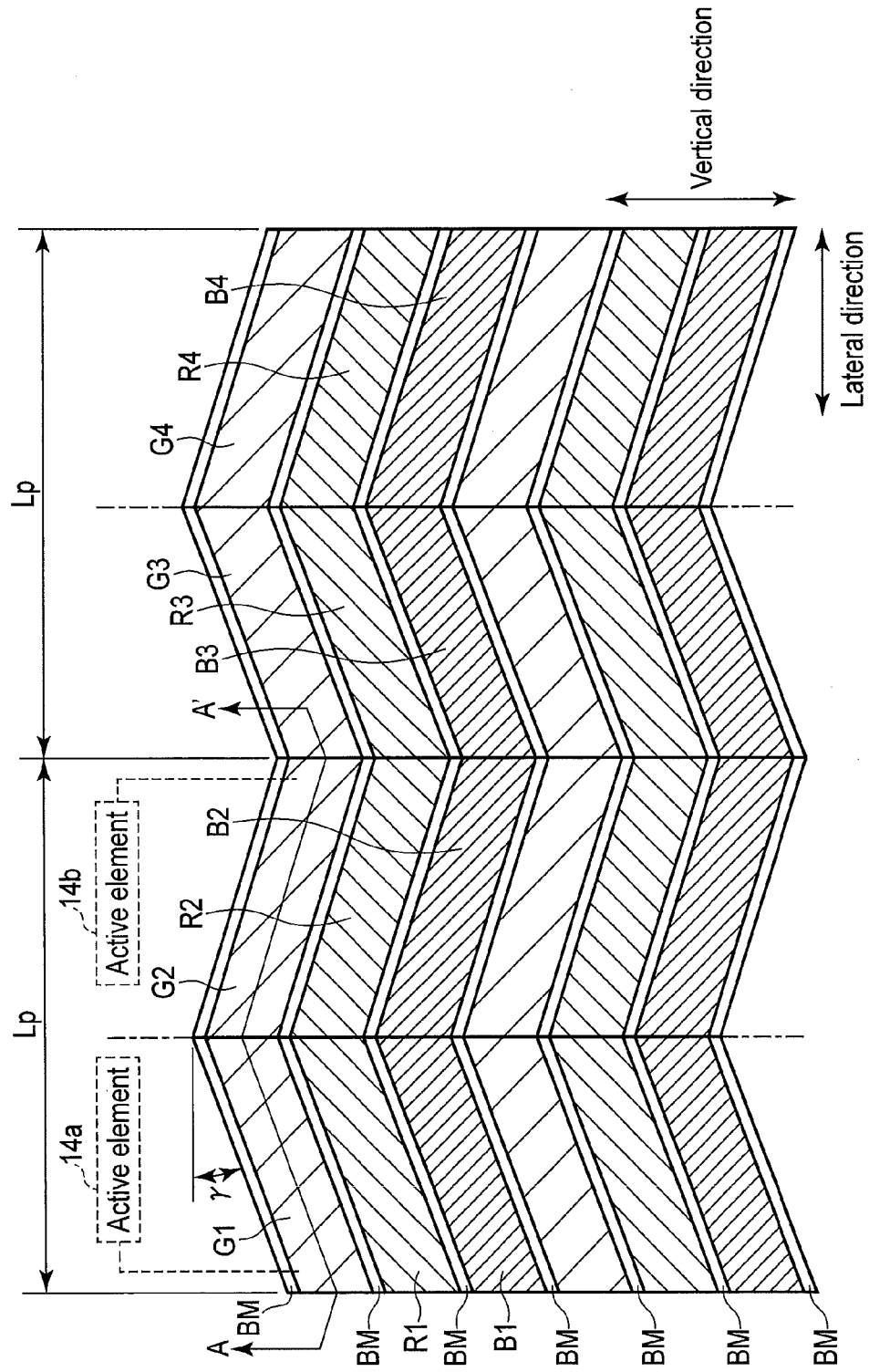
FIG. 3 is a plan view illustrating an example of a color filter substrate of the liquid crystal display device according to the first embodiment.

FIG. 3 is a plan view illustrating an example of the color filter substrate 5 of the liquid crystal display device 1 according to the embodiment. FIG. 3 is a front view of the color filter substrate 5, and illustrates a state in which the color filter substrate 5 is viewed from the observer.

Each pixel has a laterally elongated shape. In FIG. 3, each pixel has a parallelogrammatic shape which is long in the lateral direction and short in the vertical direction. This parallelogrammatic shape has a long side with an angle γ to the lateral direction, and has a short side parallel to the vertical direction.

Two pixels of the same color are arranged in juxtaposition. A plurality of pixels of the same color are arranged in the lateral direction, and a plurality of pixels of different colors are arranged in the vertical direction. Those pixels of the plural pixels, which neighbor in the lateral direction, have a shape of line-symmetry with respect to a center line of the neighboring pixels. The arrangement of pixels in the lateral direction has a repetitive pattern of two pixels of the same color in a V shape or an inverted-V shape.

The plural pixels include a first picture element which is composed of laterally arranged green pixels G1 and G2, red pixels R1 and R2 and blue pixels B1 and B2, and a second picture element which is composed of laterally arranged green pixels G3 and G4, red pixels R3 and R4 and blue pixels B3 and B4.

The angle γ between the long side of the parallelogrammatic shape and the lateral direction is set in a range of, e.g. about 5° to 30°, and is set at, for instance, about 15°. With the pixel having the angle γ to the lateral direction, moiré can be reduced, and moreover the liquid crystal molecules can be made easily rotatable in an FFS (IPS) liquid crystal display device. In the present embodiment, by arranging the pixels of the same color in the lateral direction, three-dimensional image display with less color non-uniformity can be realized.

A black matrix BM partitions the pixels. In FIG. 3, the black matrix BM is formed between vertically neighboring pixels, and is not formed between the laterally neighboring pixels. Specifically, the black matrix BM is formed at an upper side and a lower side of each pixel. By not forming the black matrix BM between the laterally neighboring pixels, bright three-dimensional image display with less color moiré can be realized.

Under the color filter substrate 5, the array substrate 6 is provided via the liquid crystal layer 7. In other words, the color filter substrate 5 and array substrate 6 are opposed. The liquid crystal layer 7 is provided between the color filter substrate 5 and array substrate 6. The array substrate 6 includes active elements 14*a*, 14*b*. As the active element 14*a*, 14*b*, for example, a thin-film transistor (TFT) is used. Incidentally, the array substrate 6 may be configured to include some other active element as a light reception element.

In the description below, pixels G1 and G2 will be described as typical examples, but other pixels have the same features.

A width Lp of two pixels G1 and G2 in the lateral direction is made to agree with the width of a semicylindrical lens. The pixel G1, G2 may be configured to include a light reception element 13 used as an optical sensor, in addition to the active element 14*a*, 14*b* which drives the liquid crystal layer 7.

Figure 4:
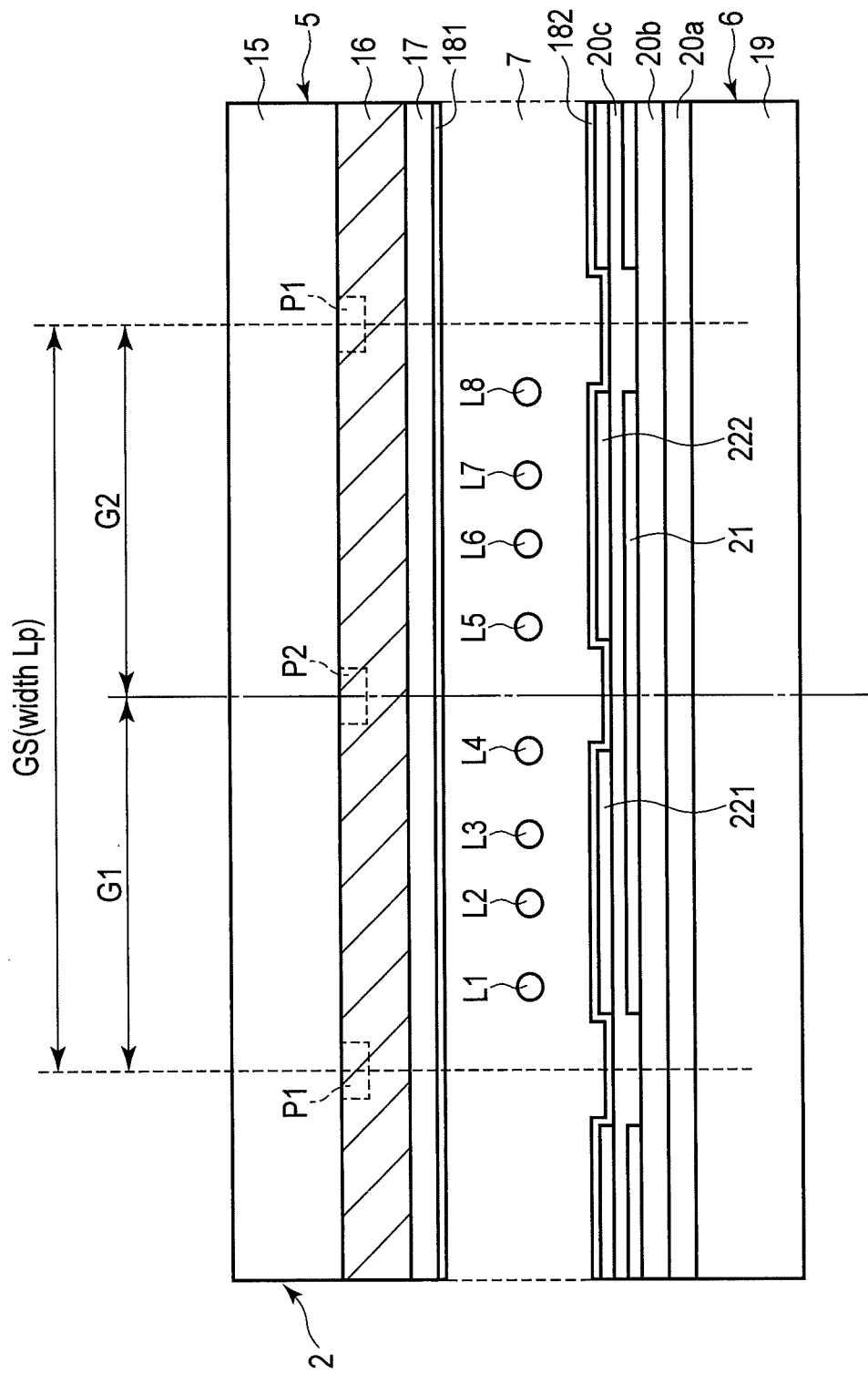
FIG. 4 is a cross-sectional view illustrating an example of the liquid crystal display device according to the first embodiment.

FIG. 4 is a cross-sectional view illustrating an example of the liquid crystal display device 1 according to the embodiment. FIG. 4 corresponds to an A-A' cross section in FIG. 3. Plural green pixels G1 and G2 are formed in juxtaposition in the lateral direction (horizontal direction).

The color filter substrate 5 is configured such that a black matrix BM, a color filter (color layer) 16, a transparent resin layer 17 and an alignment film 181 are formed on a transparent substrate 15. In the cross section of FIG. 4, the black matrix BM is not depicted, but the black matrix BM is formed, for example, between the transparent substrate 15 and color filter 16. The color filter substrate 5 includes color filters 16 corresponding to the plural pixels. Of the color filters 16, a green filter is associated with the green pixel, a red filter is associated with the red pixel, and a blue filter is associated with the blue pixel.

In the liquid crystal display device 1, the transparent substrate 15 side of the color filter substrate 5 faces the observer, and the alignment film 181 side of the color filter substrate 5 faces the liquid crystal layer 7. In FIG. 4, polarizers are omitted.

Since the cross section of FIG. 4 is a cross section of a part where the black matrix BM is not formed, the black matrix BM is not shown in FIG. 4. However, for example, in a case where priority is placed on the contrast in two-dimensional image display rather than in three-dimensional image display, a black matrix BM in the vertical direction may be formed, for example, at positions P1 of end portions of a pixel set GS composed of two pixels G1 and G2, and at a position P2 at a central part of the two pixels G1 and G2. The positions P1, P2 are between the transparent substrate 15 and color filter 16 in the vertical direction (the direction of stacking of layers of the liquid crystal panel 2) of the cross section of FIG. 4.

The array substrate 6 is configured such that insulation layers 20*a* and 20*b*, a common electrode 21, an insulation layer 20*c*, pixel electrodes 221 and 222, and an alignment film 182 are formed on the transparent substrate 19. For example, SiN is used for the insulation films 20*a* to 20*c*. The array substrate 6 includes a plurality of pixel electrodes 221, 222, which correspond to the plural pixels G1, G2.

In the liquid crystal display device 1, the transparent substrate 19 side of the array substrate 6 is the back side of the liquid crystal panel 2, and the alignment film 182 side of the array substrate 6 faces the liquid crystal layer 7.

The pixel electrode 221 of the pixel G1 and the pixel electrode 222 of the pixel G2 are formed in line-symmetry with respect to the center axis of the pixel set GS. The pixel electrode 221 of the pixel G1 and the pixel electrode 222 of the pixel G2 are spaced apart, with the center line of the neighboring pixels G1 and G2 being interposed.

The common electrode 21 of the pixels G1 and G2 is formed in symmetry with respect to the center line of the pixel set GS.

The common electrode 21, which is provided in the laterally neighboring pixels G1 and G2, has a shape of line-symmetry with respect to the center line of the laterally neighboring pixels G1 and G2.

The pixel electrode 221, 222 may be configured to have, for example, a comb shape pattern or a stripe pattern.

The common electrode 21 and pixel electrode 221, 222 are formed of, for example, transparent, electrically conductive films.

In the present embodiment, the electrode configuration of the pixel set GS is line-symmetric. Specifically, the positions of the electrodes of the two neighboring pixels G1 and G2 are line-symmetric.

Accordingly, the bearing of the longitudinal direction of the liquid crystal molecules of the liquid crystal layer 7 of the pixel G1 in a case where a voltage is applied between the pixel electrode 221 and the common electrode 21, and the bearing of the longitudinal direction of the liquid crystal of the liquid crystal layer 7 of the pixel G2 in a case where a voltage is applied between the pixel electrode 222 and the common electrode 21, are line-symmetric.

The pixel electrodes 221, 222 and the common electrode 21 overlap, as viewed in plan from the observer side, and the overlapping part can be used as a storage capacitance for liquid crystal display.

The liquid crystal layer 7 includes liquid crystal molecules L1 to L8 with initial vertical alignment. Each of the liquid crystal molecules L1 to L8 has a shape with a longitudinal direction, and has a negative dielectric constant anisotropy.

Figure 5:
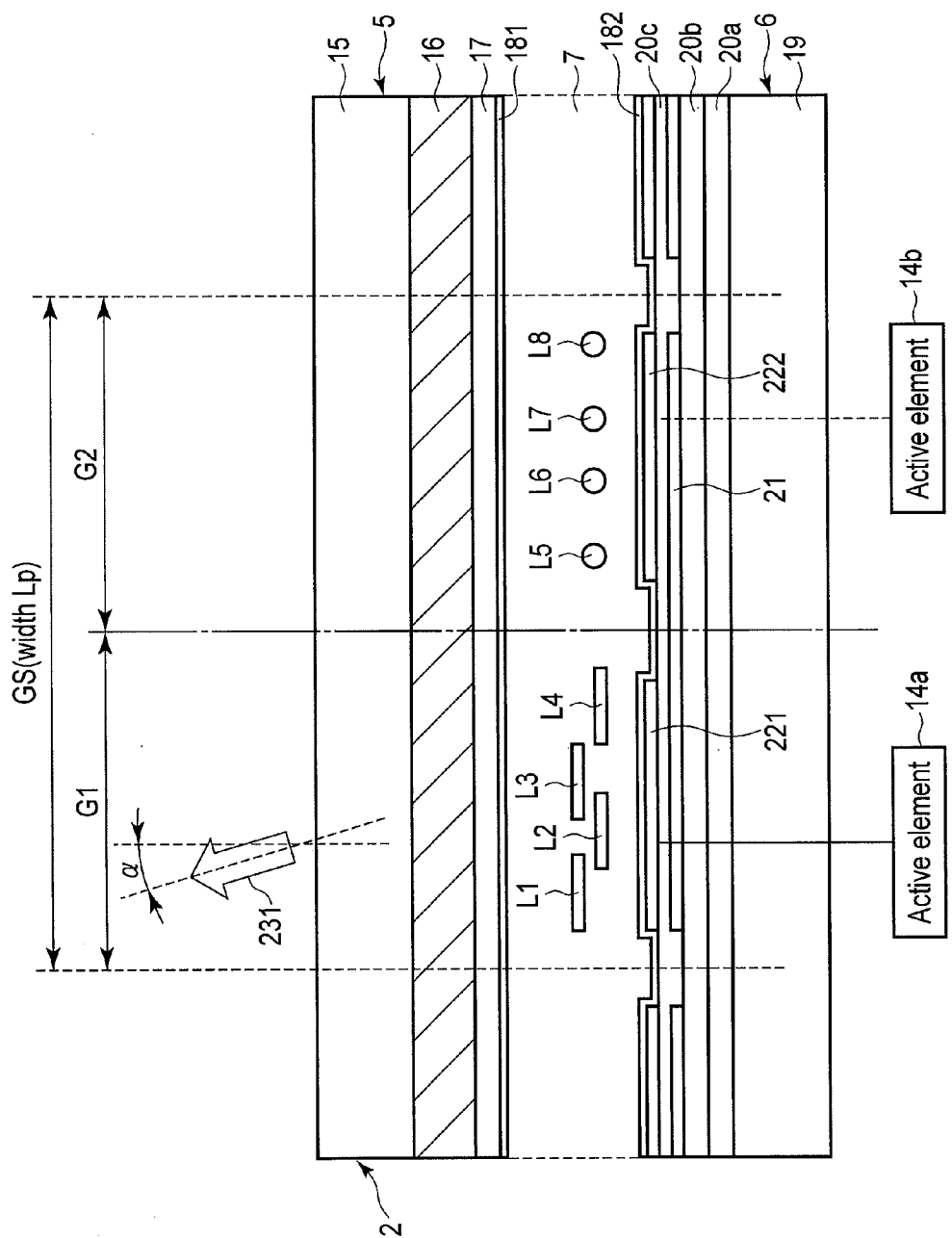
FIG. 5 is a cross-sectional view illustrating an example of a liquid crystal operation and emission light at a time when a liquid crystal driving voltage is applied to a pixel electrode of one of two neighboring pixels.
Figure 6:
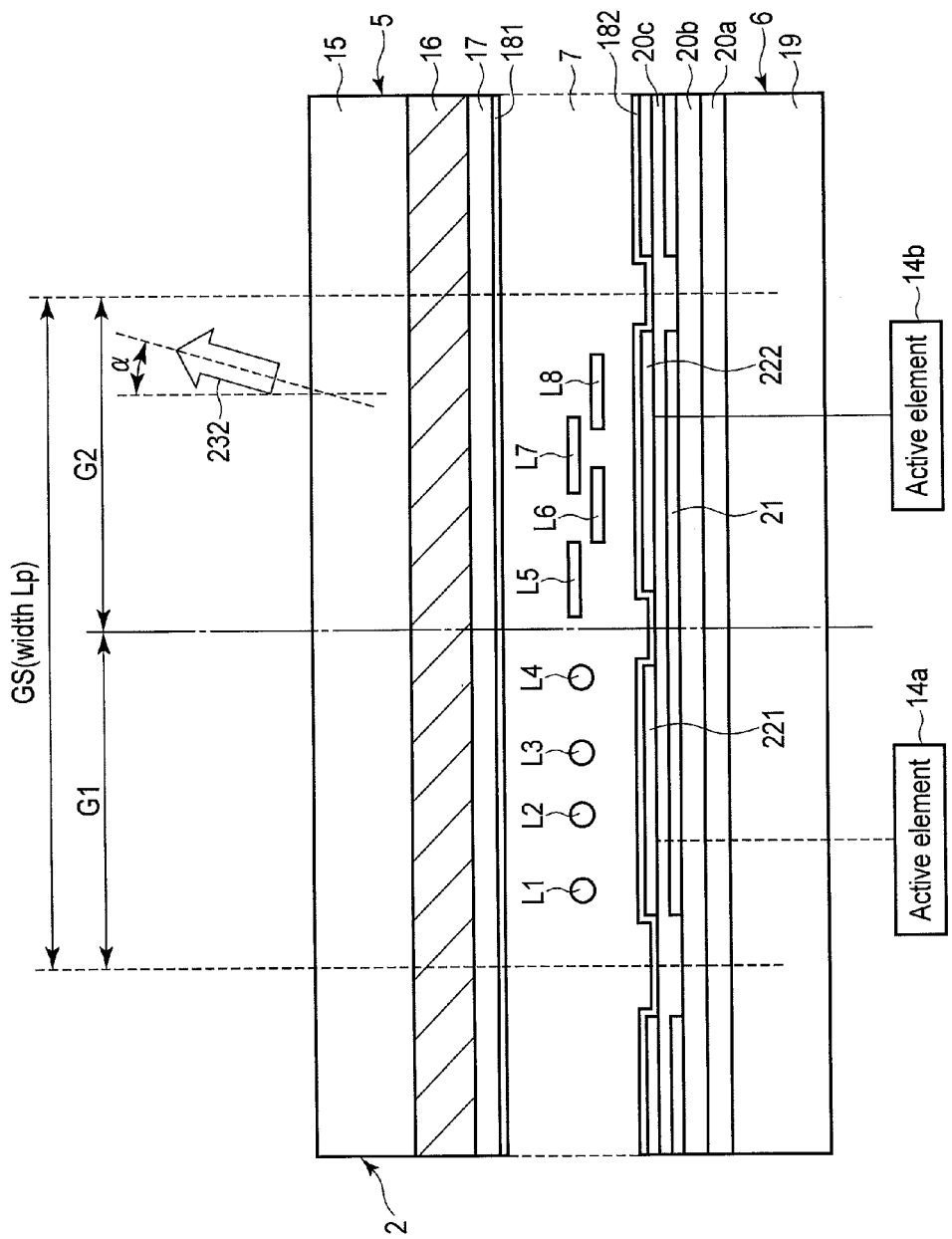
FIG. 6 is a cross-sectional view illustrating an example of the liquid crystal operation and emission light at a time when a liquid crystal driving voltage is applied to a pixel electrode of the other of the two neighboring pixels.
Figure 7:
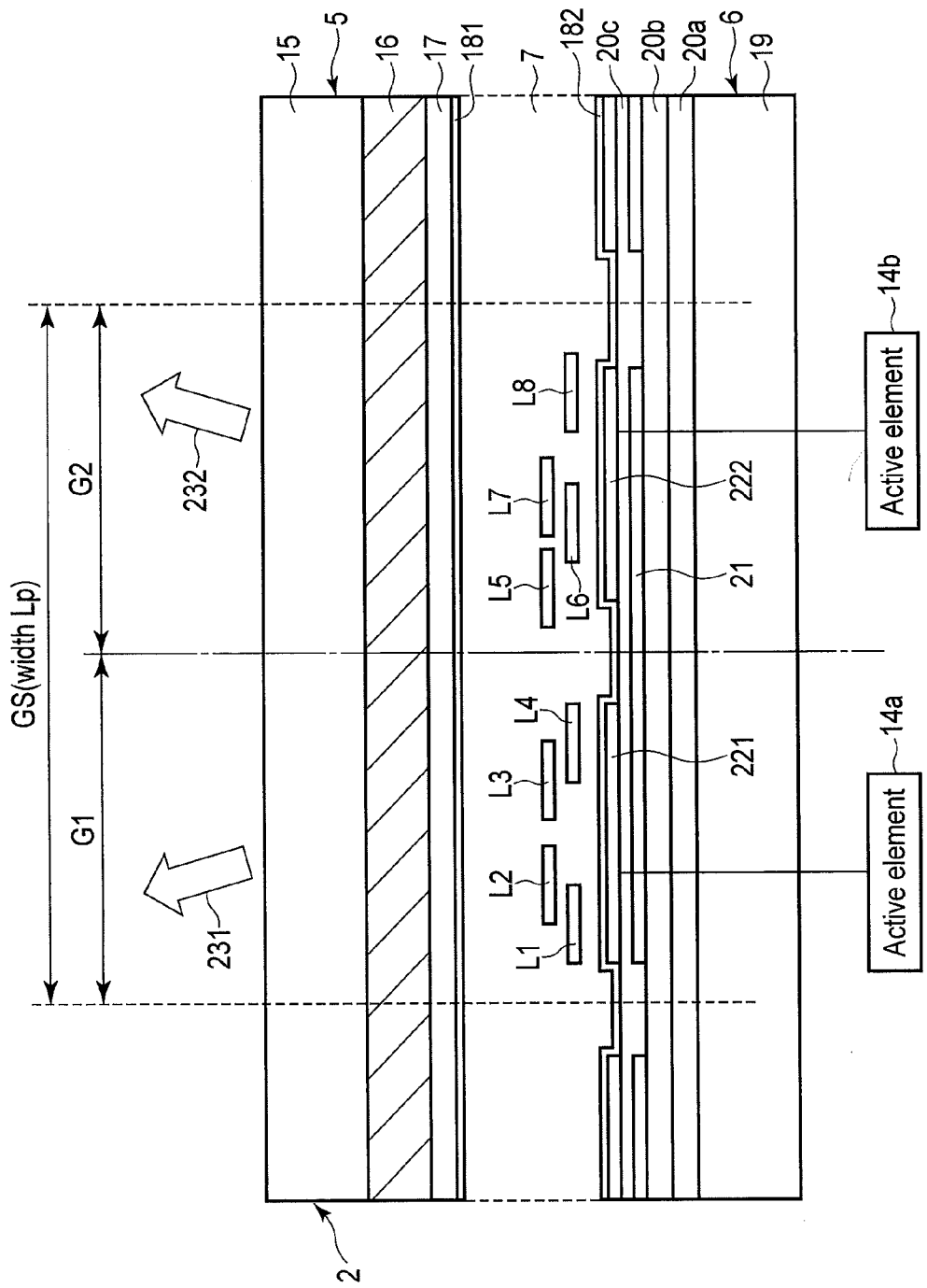
FIG. 7 is a cross-sectional view illustrating an example of the liquid crystal operation and emission light at a time when a liquid crystal driving voltage is applied to the the pixel electrodes of the two neighboring pixels.

Referring to FIG. 5 to FIG. 7, a description is given of the relationship between a liquid crystal operation and emission light.

FIG. 5 is a cross-sectional view showing an example of the liquid crystal display device 1, FIG. 5 illustrating the liquid crystal operation and emission light 231 at a time when a liquid crystal driving voltage is applied to the pixel electrode 221 of the pixel G1 that is one of the two neighboring pixels G1 and G2.

In FIG. 5, the active element 14a applies a voltage to the pixel electrode 221 of the pixel G1. Then, an electric field from the pixel electrode 221 to the common electrode 21 occurs. The liquid crystal molecules L1 to L4 with initial horizontal alignment rotate horizontally relative to the substrate plane, in a manner to become perpendicular to electric force lines generated by applying the voltage to the pixel electrode 221. In FIG. 5, the longitudinal direction of the liquid crystal molecules L1 to L4 is directed in the vertical direction in the cross section of FIG. 5 in a state in which no voltage is applied to the pixel electrode 221, and the longitudinal direction of the liquid crystal molecules L1 to L4 is rotated and directed in the horizontal direction (lateral direction) after a voltage is applied to the pixel electrode 221.

By this liquid crystal operation, leftward emission light 231 is emitted. As described above, the angle α of the emission light 231 is adjusted by the optical control element 101, 102.

FIG. 6 is a cross-sectional view showing an example of the liquid crystal display device 1, FIG. 6 illustrating the liquid crystal operation and emission light 232 at a time when a liquid crystal driving voltage is applied to the pixel electrode 222 of the pixel G2 that is the other of the two neighboring pixels G1 and G2.

In FIG. 6, the active element 14b applies a voltage to the pixel electrode 222. Then, an electric field from the pixel electrode 222 to the common electrode 21 occurs. The liquid crystal molecules L5 to L8 with initial horizontal alignment rotate horizontally relative to the substrate plane, in a manner to become perpendicular to electric force lines generated by applying the voltage to the pixel electrode 222. In FIG. 6, the longitudinal direction of the liquid crystal molecules L5 to L8 is directed in the vertical direction in the cross section of FIG. 6 in a state in which no voltage is applied to the pixel electrode 222, and the longitudinal direction of the liquid crystal molecules L5 to L8 is rotated and directed in the horizontal direction (lateral direction) after a voltage is applied to the pixel electrode 221.

The direction of rotation of liquid crystal molecules L1 to L4 in the pixel G1 is opposite to the direction of rotation of liquid crystal molecules L5 to L8 in the pixel G2.

By this liquid crystal operation, rightward emission light 232 is emitted. As described above, the angle α of the emission light 232 is adjusted by the optical control element 101, 102.

By executing, in synchronism, the liquid crystal operation illustrated in FIG. 5 and FIG. 6 and the light emission of the solid-state light emission elements 91 and 92, it is possible to perform three-dimensional image display or to display different images in the direction of the right eye 81 and in the direction of the left eye 82.

FIG. 7 is a cross-sectional view showing an example of the liquid crystal display device 1, FIG. 7 illustrating the liquid crystal operation and emission light 231, 232 at a time when a liquid crystal driving voltage is applied to the pixel electrodes 221, 222 of the two neighboring pixel G1 and G2.

In this embodiment, if a liquid crystal driving voltage is applied to the pixel electrodes 221 and 222 corresponding to the neighboring pixel G1 and G2, the liquid crystal molecules of the neighboring pixels G1 and G2 tilt in line-symmetric directions with respect to the center axis.

By applying a voltage to the pixel electrodes 221 and 222 of the two neighboring pixel G1 and G2, bright two-dimensional image display with a large viewing angle can be realized.

In this manner, the liquid crystal display device 1 according to the embodiment can very easily effect switching between a three-dimensional image and a two-dimensional image.

In the present embodiment, the description has been given by using liquid crystal molecules L1 to L8 with negative dielectric constant anisotropy. However, this embodiment is similarly applicable to liquid crystal molecules with positive dielectric constant anisotropy.

A description will be given below of the shape of the pixel electrode 221, 222, and the rotation of liquid crystal molecules L1 to L8, as viewed in plan. The rotation as viewed in plan is horizontal rotation.

Figure 8:
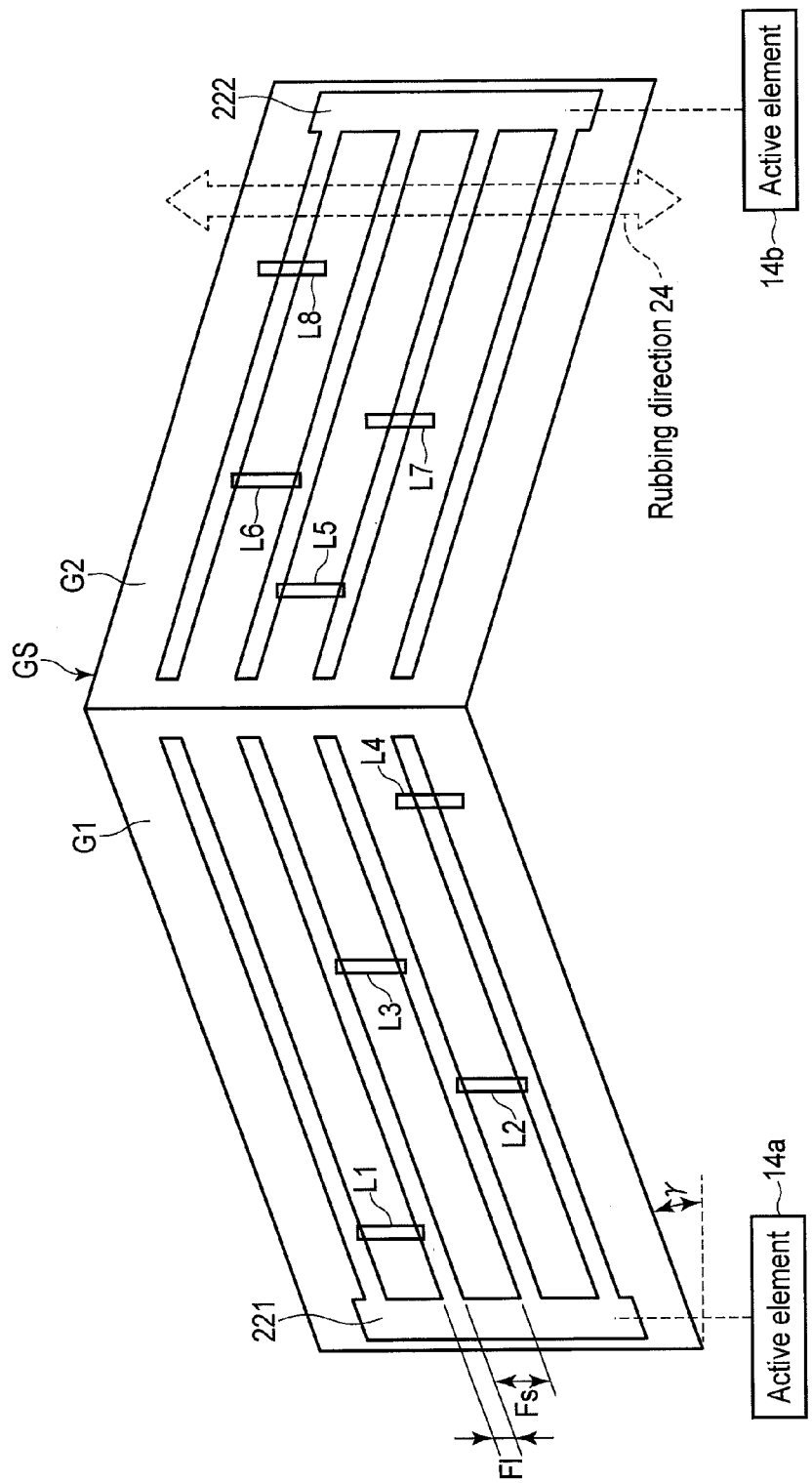
FIG. 8 is a plan view illustrating an example of a shape of pixel electrodes of two neighboring pixels and a rubbing direction of an alignment film of the liquid crystal display device according to the first embodiment.

FIG. 8 is a plan view illustrating an example of the shape of pixel electrodes 221, 222 of two neighboring pixels G1, G2 and a rubbing direction of the alignment film 181, 182 of the liquid crystal display device 1 according to the present embodiment.

In this embodiment, the pixel electrode 221, 222 of the pixel G1, G2 has a comb shape. The pixel electrodes 221 and 222 are line-symmetric with respect to the center line of the neighboring pixels G1 and G2. A plurality of comb-tooth portions of the pixel electrode 221, 222 extend from the end portion side of the pixel set GS toward the center side. A connecting portion of the plural comb-tooth portions of the pixel electrode 221, 222 is disposed on the end portion side of the pixel set GS. The longitudinal direction of the plural comb-tooth portions of the pixel electrode 221, 222 is parallel to the long side of the pixel G1, G2. The width of the comb-tooth portion is F1, and the space width (gap) of comb-tooth portions is Fs.

A rubbing direction 24 of the alignment film 181, 182 is parallel to the vertical direction (the short side of the pixel). The initial alignment direction of the liquid crystal molecules L1 to L8 becomes identical to this rubbing direction. Accordingly, in the initial alignment state, the longitudinal direction of the liquid crystal molecules L1 to L8 becomes parallel to the vertical direction, as viewed in plan. The rubbing may be mechanical rubbing, or may be realized by alignment treatment by optical alignment.

As the material of the alignment film 181, 182, for example, polyimide or polyorganosiloxane is used. The alignment film 182 is formed on the pixel electrodes 221, 222.

The alignment film 181, 182 may have photosensitivity. In addition, instead of the photosensitive alignment film 181, 182, photosensitive monomers may be dispersed in the liquid crystal layer 7. In this manner, in the case of using the photosensitive alignment film 181, 182, or in the case of dispersing the photosensitive monomers in the liquid crystal layer 7, alignment treatment is realized by radiating light while applying a voltage between the pixel electrode 221, 222 and the common electrode 21.

FIG. 9 is a plan view illustrating an example of the liquid crystal operation at a time when a liquid crystal driving voltage is applied to the pixel electrode 221 of the pixel G1 that is one of the two neighboring pixels G1 and G2.

Figure 10:
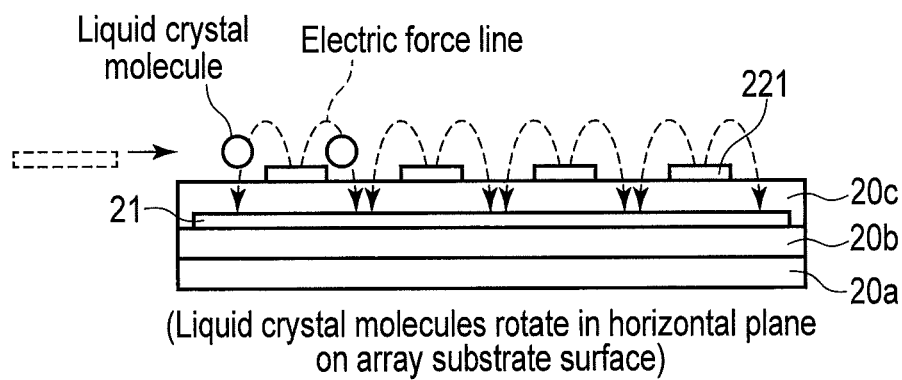
FIG. 10 is a cross-sectional view illustrating an example of a state of electric force lines at a time when a liquid crystal driving voltage is applied.

In addition, FIG. 10 is a cross-sectional view illustrating an example of the state of electric force lines at a time when a liquid crystal driving voltage is applied. FIG. 10 corresponds to a C—C' cross section in FIG. 9.

In FIG. 9 and FIG. 10, a voltage is applied to the pixel electrode 221, and thereby electric force lines occur in a direction which is perpendicular to the longitudinal direction of the comb-tooth portions of the pixel electrode 221 and is directed from the pixel electrode 221 toward the common electrode 21. The liquid crystal molecules L1 to L4 on the pixel electrode 221 of the pixel G1 horizontally rotate so as to become perpendicular to the electric force lines. As a result, the longitudinal direction of the liquid crystal molecules L1 to L4 becomes substantially parallel to the longitudinal direction of the comb-tooth portions of the pixel electrode 221.

FIG. 11 is a plan view illustrating an example of the liquid crystal operation at a time when a liquid crystal driving voltage is applied to the pixel electrode 222 of the pixel G2 that is the other of the two neighboring pixels G1 and G2.

In FIG. 11, a voltage is applied to the pixel electrode 222, and thereby electric force lines occur in a direction which is perpendicular to the longitudinal direction of the comb-tooth portions of the pixel electrode 222 and is directed from the pixel electrode 222 toward the common electrode 21. The liquid crystal molecules L5 to L8 on the pixel electrode 222 of the pixel G2 horizontally rotate so as to become perpendicular to the electric force lines. As a result, the longitudinal direction of the liquid crystal molecules L5 to L8 becomes substantially parallel to the longitudinal direction of the comb-tooth portions of the pixel electrode 222.

FIG. 12 is a plan view illustrating an example of the liquid crystal operation at a time when a liquid crystal driving voltage is applied to the pixel electrodes 221 and 222 of the two neighboring pixels G1 and G2.

If a voltage is applied to the pixel electrodes 1221 and 222, the liquid crystal molecules L1 to L4 on the pixel electrode 221 horizontally rotate in the pixel G1, and the liquid crystal molecules L5 to L8 on the pixel electrode 222 horizontally rotate in the pixel G2. The direction of rotation in the pixel G1 and the direction of rotation in the pixel G2 are line-symmetric with respect to the center line of the pixels G1 and G2. Thereby, the symmetric property of the liquid crystal operation in the pixels G1 and G2 is improved, and the viewing angle is increased.

As the liquid crystal material, for example, a liquid crystal material including fluorine atoms in a molecular structure (hereinafter referred to as "fluorine-based liquid crystal") is preferable. The fluorine-based liquid crystal is low in viscosity and dielectric constant, and is small in amount of taken-in ionic impurities. In the case where the fluorine-based liquid crystal is used as the liquid crystal material, the degradation in capability, such as a decrease in voltage retention ratio due to impurities, is small, and display non-uniformity and display image persistence can be suppressed. As the liquid crystal with negative dielectric constant anisotropy, for example, a nematic liquid crystal having a birefringence index of about 0.1 in the neighborhood of room temperature can be used. As the liquid crystal with positive dielectric constant anisotropy, various liquid crystal materials are applicable. In a liquid crystal display device for which a high responsivity, rather than suppression in power consumption, is required, a liquid crystal having a large dielectric constant anisotropy may be used. The thickness of the liquid crystal layer 7 is not particularly limited. In the embodiment, Δnd of the liquid crystal layer 7, which is effectively applicable, is, for example, in a range of about 300 nm to 500 nm.

In the liquid crystal display device 1 of the above-described embodiment, display non-uniformity such as moiré can be eliminated, the display quality of a three-dimensional image can be enhanced, bright display can be performed, and easy switching can be made between three-dimensional display and two-dimensional display. These advantageous effects will be concretely described below.

In the present embodiment, laterally elongated pixels are formed. In this structure, a row of green pixels, a row of red pixels and a row of blue pixels are arranged in the lateral direction.

In ordinary vertically elongated pixels, three kinds of pixels, namely a red pixel, a green pixel and a blue pixel, are arranged in the lateral direction. In order to drive active elements located below the pixels, drivers for sending video signals in the vertical direction are necessary for the three colors.

By contrast, in the embodiment, since the laterally elongated pixels of the same color are arranged in the lateral direction and the three different colors are arranged in stripes in the vertical direction, the number of drivers of pixels can be reduced to ⅓ for the ordinary pixels, and the liquid crystal panel 2 can be manufactured at low cost. Since the power consumption of the drivers which handle video signals is high, the present embodiment can provide the liquid crystal display device 1 with low power consumption.

In addition, since the pixel width in the lateral direction of the pixels of each color in the liquid crystal display device 1 according to the embodiment is laterally large and is fixed, high-quality display with no color non-uniformity in units of a picture element can be realized, compared to the case of vertically elongated, inclined pixels. Furthermore, since thin-film transistors of an oxide semiconductor, which has low sensitivity in the visible light range, can be used as the active elements 14a, 14b for driving the liquid crystal, the liquid crystal display device 1 with a fine black matrix BM and a large aperture ratio can be provided.

In this embodiment, display non-uniformity such as moiré, which is a problem in conventional three-dimensional display, can be eliminated, and, with bright display, switching between three-dimensional display and two-dimensional display can be realized by a simple configuration.

The liquid crystal display device 1 according to the embodiment is applicable to display devices which are disposed on a mobile phone, a game console, a tablet terminal, a notebook PC (personal computer), a television, a car dashboard, etc.

Incidentally, as a modification of the embodiment, the liquid crystal display device 1 may further include, in order to eliminate moiré, a plurality of triangular prisms having a longitudinal direction which is substantially perpendicular to the longitudinal direction of the plural triangular prisms.

In addition, for more effective three-dimensional image display, the longitudinal direction of the plural triangular prisms and the longitudinal direction of the plural semicylindrical lenses may be made substantially parallel, and the width of the triangular prism may be set at double the length of the pixel in the lateral direction.

The width of the semicylindrical lens may be set at an integer number of times of the width of two pixels in the lateral direction.

Another optical control element including an array of a plurality of semicylindrical lenses may be disposed between the array substrate 6 and the backlight unit 4, or on that surface side (observer side) of the color filter substrate 5, which is opposite to the liquid crystal layer 7 side. Furthermore, the longitudinal direction of the semicylindrical lenses included in this other optical control element may be set to be perpendicular to the lateral direction.

Second Embodiment

The present embodiment is a modification of the first embodiment, and a description is given of a liquid crystal display device further including a transparent electrode film between the transparent substrate 15 of the color filter substrate and the color filter 16.

Figure 13:
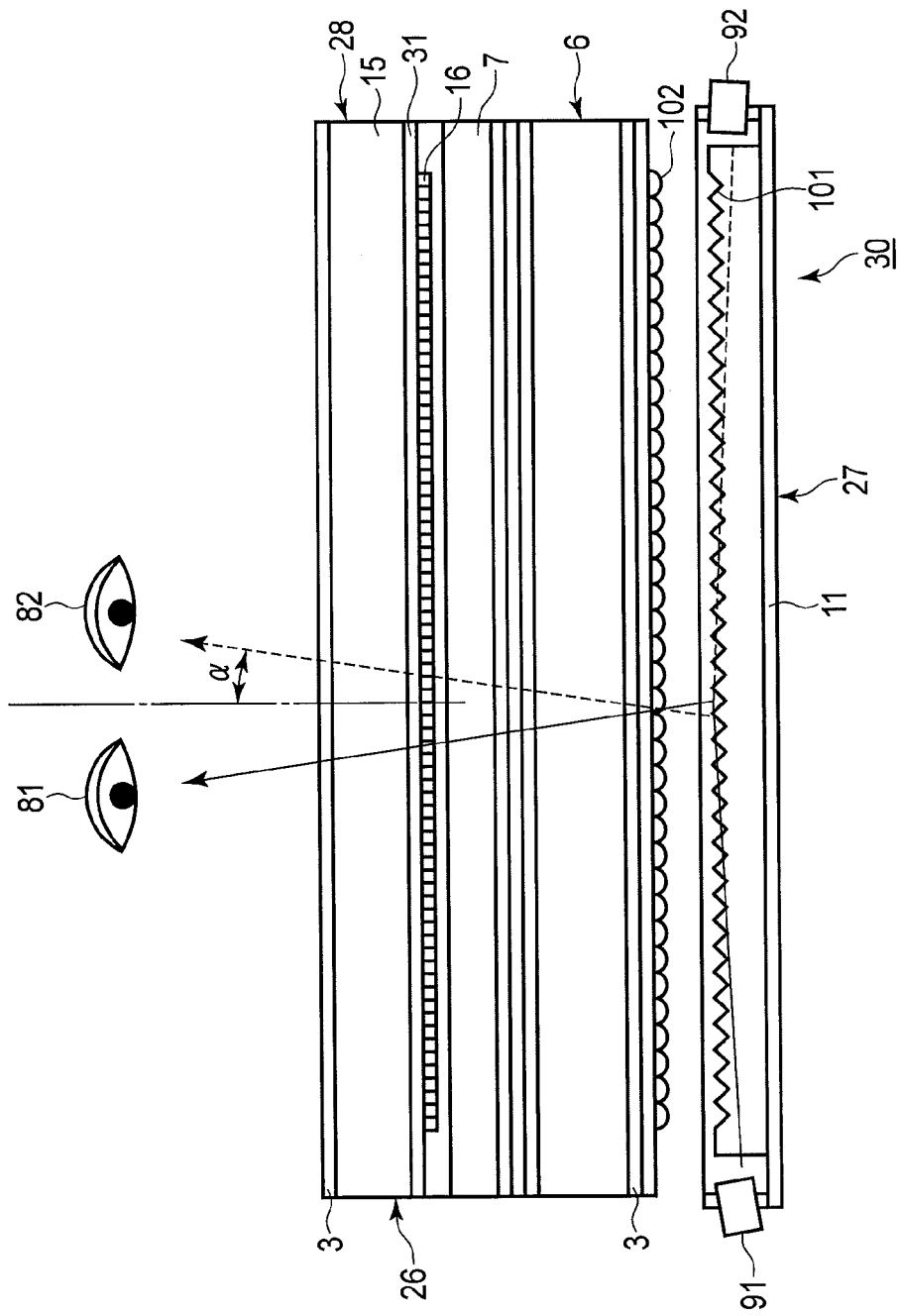
FIG. 13 is a cross-sectional view illustrating an example of a liquid crystal display device according to a second embodiment.

FIG. 13 is a cross-sectional view illustrating an example of a liquid crystal display device according to the present embodiment. FIG. 13 is a cross-sectional view in the lateral direction.

FIG. 14 is a cross-sectional view illustrating an example of a liquid crystal display device 30 according to the second embodiment.

The liquid crystal display device 30 includes, as basic structural elements, a liquid crystal panel 26, polarizers 3, and a backlight unit 27. Incidentally, like the liquid crystal display device 1 according to the above-described first embodiment, the liquid crystal display device 30 may include a controller 12 and a light reception element 13.

Solid-state light emission elements 91, 92 are disposed at both ends of the backlight unit 27. The polarizer 3 may be formed by attaching a retardation plate.

The liquid crystal panel 26 is configured such that a color filter substrate 28 and an array substrate 6 are opposed to each other, and a liquid crystal layer 7 is provided between the color filter substrate 28 and the array substrate 6. In the liquid crystal panel 26, a plurality of laterally elongated parallelogrammatic pixels, which include red pixels, green pixels and blue pixels, are arranged in the lateral direction. In this embodiment, the pixels are arranged in the lateral direction such that the pixels of the same color neighbor. The polarizer 3 and a retardation plate (not shown) are provided on a front surface and/or a back surface of the liquid crystal panel 2. The main structure of the liquid crystal display device 30 according to this embodiment is substantially the same as that of the above-described first embodiment.

The liquid crystal display device 30 according to the embodiment includes the color filter substrate 28 which further includes a transparent electrode film 31 between the transparent substrate 15 and color filter 16.

In the present embodiment, for example, a black matrix BM is formed along each side of the parallelogrammatic pixel. Specifically, in this embodiment, the black matrix BM is disposed between laterally neighboring pixels and between vertically neighboring pixels. The long sides of the parallelogram have an angle γ to the lateral direction, for the purpose of a measure against moiré at a time of three-dimensional image display.

In the embodiment, both the longitudinal direction of the triangular prism in the optical control element 101 and the longitudinal direction of the cylindrical prism in the optical control element 102 are perpendicular to the lateral direction and the normal direction of the liquid crystal panel 26 (i.e. perpendicular to the cross section of FIG. 13). In addition, both the triangular prism and the cylindrical lens have the same width as the width Lp of two pixels. An end portion in the lateral direction of the pixel, an end portion in the lateral direction of the triangular prism and an end portion in the lateral direction of the cylindrical lens are aligned.

Figure 15:
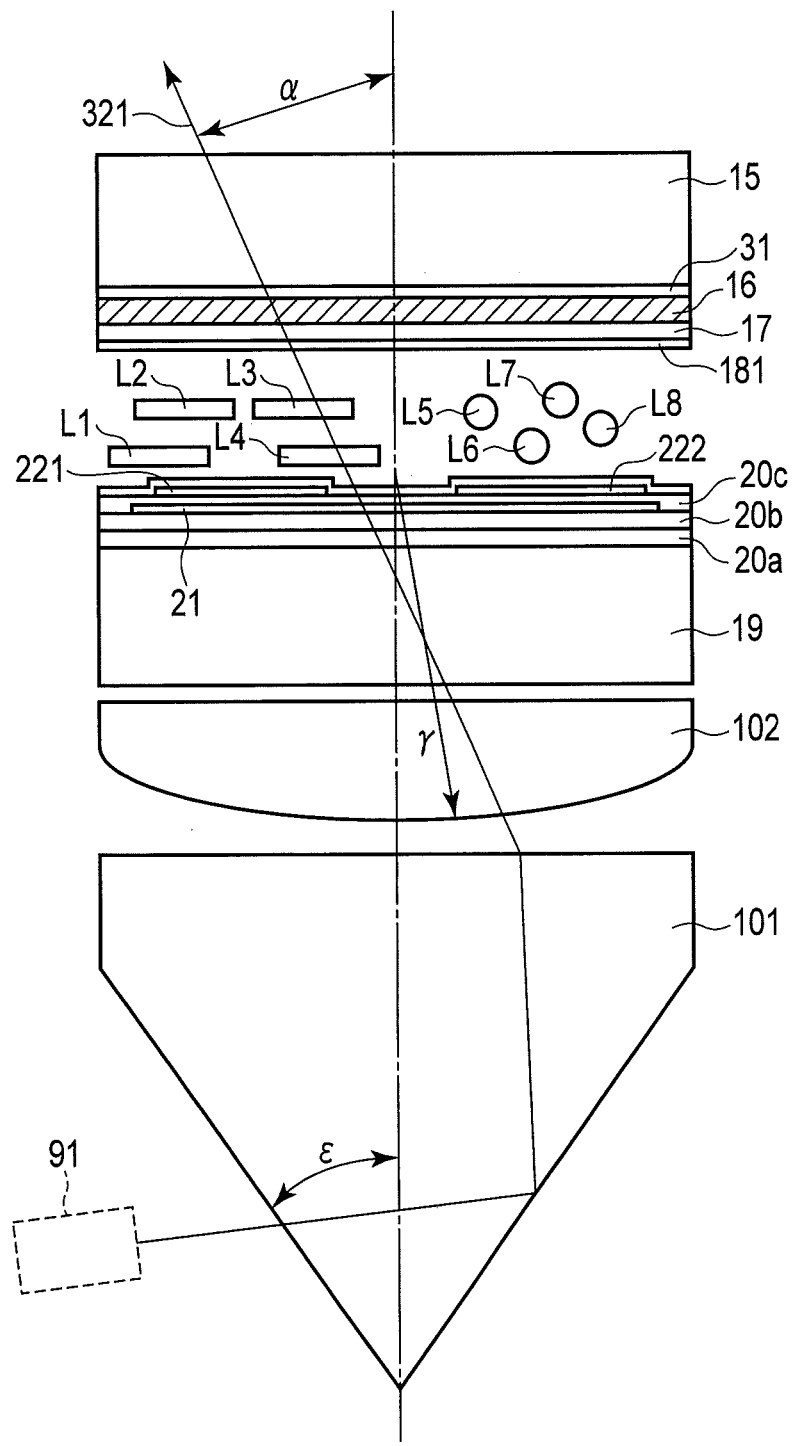
FIG. 15 is a cross-sectional view illustrating an example of synchronization between a pixel electrode of one of two neighboring pixels and a solid-state light emission element.

FIG. 15 is a cross-sectional view illustrating an example of synchronization between the pixel electrode 221 of the pixel G1, which is one of the two neighboring pixels G1 and G2, and the solid-state light emission element 91.

FIG. 16 is a cross-sectional view illustrating an example of synchronization between the pixel electrode 222 of the pixel G2, which is the other of the two neighboring pixels G1 and G2, and the solid-state light emission element 92.

FIG. 15 and FIG. 16 illustrate cross sections of the two pixels G1 and G2, and represent the operations for three-dimensional image display of the optical control elements 101, 102.

FIG. 15 illustrates an optical path in a case where a liquid crystal driving voltage has been applied to the pixel electrode 221, and the solid-state light emission element 91 has been caused to emit light in synchronism with the application of this voltage. By applying the liquid crystal driving voltage to the pixel electrode 221 in FIG. 15, liquid crystal molecules L1 to L4 of the left-side pixel G1 in FIG. 15 horizontally rotate. In synchronism with the application of the voltage to the pixel electrode 221, the solid-state light emission element 91 is caused to emit light. As illustrated in FIG. 15, the light emitted from the solid-state light emission element 91 passes through the triangular prism of the optical control element 101 and the cylindrical lens of the optical control element 102, and is emitted toward the right eye 81 of the observer as emission light 321. An emission angle α can be set, mainly based on a distal-end angle ∈ of the triangular prism and a curvature r of the cylindrical prism. For example, by adjusting the magnitude of the distal-end angle of the triangular prism, the emission light of the left-side solid-state light emission element 91 can be emitted to the opposite left eye 81.

FIG. 16 illustrates an optical path in a case where a liquid crystal driving voltage has been applied to the pixel electrode 222, and the solid-state light emission element 91 has been caused to emit light in synchronism with the application of this voltage. By applying the liquid crystal driving voltage to the pixel electrode 222 in FIG. 16, liquid crystal molecules L5 to L8 of the right-side pixel G2 in FIG. 16 horizontally rotate. In synchronism with the application of the voltage to the pixel electrode 222, the solid-state light emission element 92 is caused to emit light. As illustrated in FIG. 16, the light emitted from the solid-state light emission element 92 passes through the triangular prism of the optical control element 101 and the cylindrical lens of the optical control element 102, and is emitted toward the left eye 82 of the observer as emission light 322.

Based on video signals of a three-dimensional image, the light emission timing of the solid-state light emission element 91, 92 and the timing of voltage application to the pixel electrode 221, 222 are synchronized and controlled, and thereby three-dimensional image display can be realized.

As has been described above; by providing the angle γ to the lateral direction with respect to the plan-view shape of the pixel G1, G2, the moiré in three-dimensional image display can greatly be reduced. Furthermore, by not providing the black matrix BM in the vertical direction, the moiré due to an alignment error between the pixel and the optical control element 101, 102 can be reduced. In the case where priority is to be placed on the contrast at a time of liquid crystal display, the black matrix BM for partitioning the pixels in the vertical direction is provided.

In the present embodiment, the transparent electrode film 31 reduces the effect of an external electric field. In addition, by setting the transparent electrode film 31 and the common electrode 21 at the same potential, it becomes possible to prevent the liquid crystal molecules L1 to L8 from rising toward the color filter substrate 28 due to an electric field occurring between the transparent electrode film 31 and the pixel electrode 221, 222.

Figure 17:
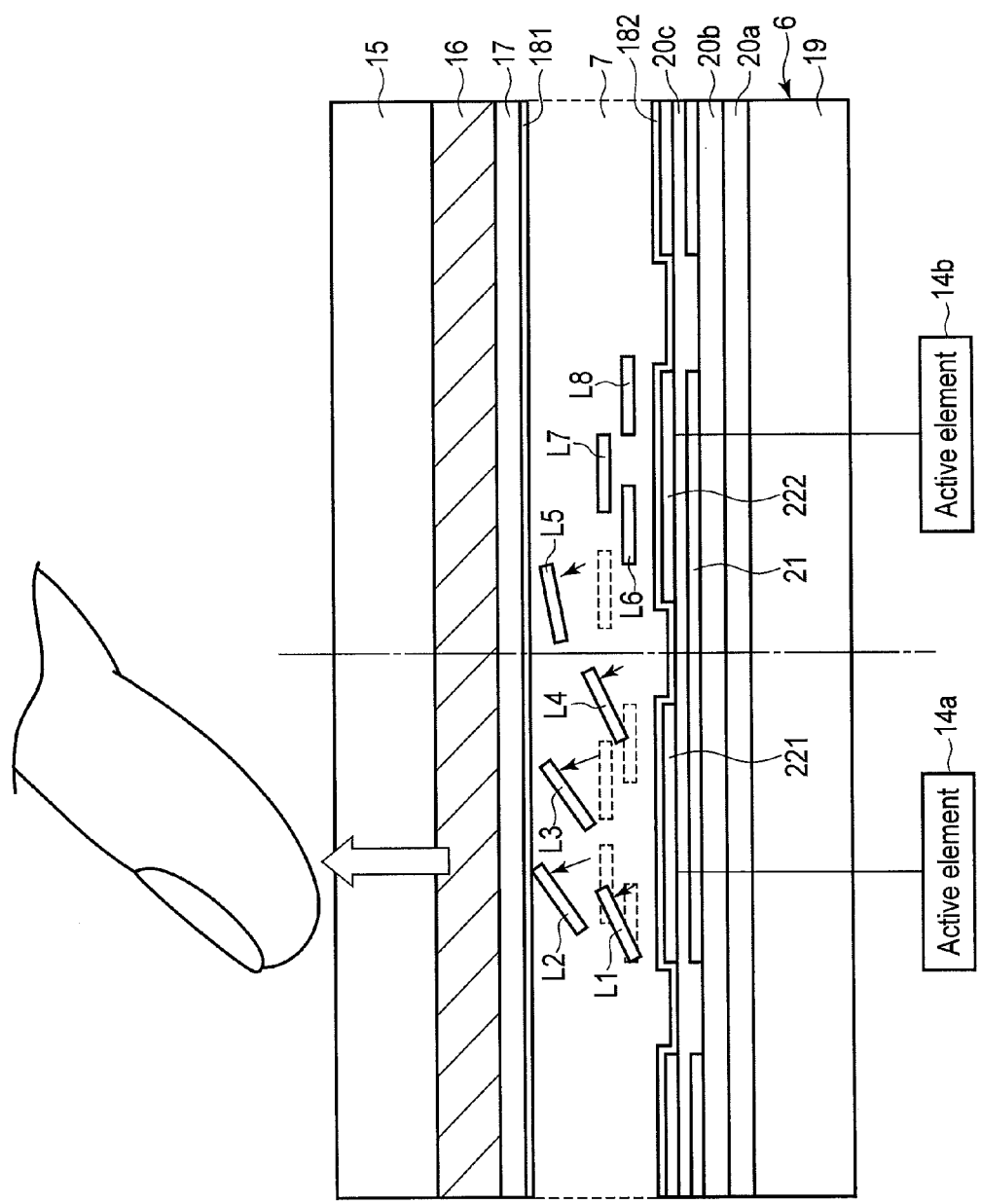
FIG. 17 is a cross-sectional view illustrating an example of a state of rising of liquid crystal molecules in a case where a charged body, such as a finger, has approached a liquid crystal panel.

FIG. 17 is a cross-sectional view illustrating an example of a state of rising of liquid crystal molecules in a case where a charged body, such as a finger, has approached the liquid crystal panel.

In the present embodiment, by providing the transparent electrode film 31 in the color filter substrate 28, the rising of liquid crystal molecules L1 to L5, as illustrated in FIG. 16, can be suppressed.

The liquid crystal molecules L1 to L8, which are prevented from rising toward the color filter substrate 28, horizontally rotate when a liquid crystal driving voltage is applied to the pixel electrode 221, 222.

In the color filter substrate 28, the color filter 16 and transparent resin layer 9 are formed on the transparent electrode film 31. The color filter 16 and transparent resin layer 17 function as dielectrics (insulators).

An equipotential line occurring from the pixel electrode 221, 222 and common electrode 21 of the array substrate 6 spreads toward the color filter 16 and transparent resin layer 17 which are dielectrics. As the effect of this, the transmittance of the liquid crystal display device 30 can be improved. Specifically, when the transparent electrode film 31 is provided between the transparent substrate 15 and color filter 16, even the liquid crystal molecules of the liquid crystal layer 7 in the vicinity of the color filter substrate 28 can be more easily driven by the application of the liquid crystal driving voltage to the pixel electrode 221, 222, and the transmittance can be enhanced. Incidentally, if the transparent electrode film 31 is formed between the transparent resin layer 17 and the alignment film 181, the transparent conductive film 31 comes in contact with the liquid crystal layer 7 via the alignment film 181, the spread of the equipotential line is substantially limited to the thickness range of the liquid crystal layer 7, the liquid crystal molecules near the pixel electrodes 221, 222 are mainly driven, and the liquid crystal molecules of the liquid crystal layer 7 in the vicinity of the color filter substrate 28 are hardly driven. In this configuration in which the transparent electrode film 31 is formed between the transparent resin layer 17 and the alignment film 181, the spread of the equipotential line decreases, and the transmittance becomes lower than in the configuration of the liquid crystal display device 30 of this embodiment.

It is desirable that the specific dielectric constant between the color filter 16 and transparent resin layer 17 be small in a range of 3.0 to 4.5 and be a uniform value. When a color material with a high specific dielectric constant, such as carbon, is used as a light-shield color material of the black matrix BM, the black matrix BM including carbon may be formed between the transparent electrode film 31 and the color filter 16. In this case, it is possible to reduce the effect on the equipotential line by the black matrix BM with the high specific dielectric constant. By performing the formation of the black matrix BM and the formation of an alignment mark by the black matrix BM on the transparent substrate 15 in advance, the formed alignment mark can be utilized at a time of forming the transparent electrode 17.

In the present embodiment, the transparent electrode film 31 is a transparent electrode, and may be formed in a stripe pattern. For example, in order to detect touching of a finger or the like, an electrostatic capacitance, which is formed between the transparent electrode film 31 with the stripe pattern and the common electrode 211, 212, may be detected. Thereby, the liquid crystal display device 30 can be provided with a touch sensing function.

For example, an electrically conductive metal oxide thin film of, e.g. ITO or IZO can be used as the material of the pixel electrode 221, 222 and the common electrode 211, 212 of the array substrate 6 of the liquid crystal display device 30 according to the embodiment.

The pixel electrode 221, 222 and the common electrode 211, 212 are electrically insulated by an insulation film 20c in the thickness direction thereof. The thicknesses of the color filter 16, transparent resin layer 17 and insulation layers 20a to 20c can be adjusted based on the thickness of the liquid crystal layer 7, dielectric constant, application voltage and driving condition.

In the case where the insulation layers 20a to 20c are formed of SiNx (silicon nitride), the practical range of film thickness of the insulation layers 20a to 20c is, for example, 0.1 μm to 1.0 μm. In the liquid crystal display device 30 according to the present embodiment, since an oblique electric field can more effectively be utilized, the range, in which electric force lines act at a time of driving voltage application, may be increased in the direction of film thickness including the liquid crystal layer 7, transparent resin layer 17 and color filter 16. Thereby, the transmittance of light can be increased. For example, Jpn. Pat. Appln. KOKAI Publication No. 2009-105424 discloses a technique of forming signal lines, such as gate lines and source lines, by a single layer of an aluminum alloy having a low contact property with ITO that is an electrically conductive metal oxide. To further stack an insulation layer on the pixel electrode 221, 222 is preferable since this has an effect of reducing an image persistence of the liquid crystal (the effect of non-uniformity or accumulation of electric charge) at the time of driving the liquid crystal.

The signal lines may be, for example, aluminum lines or copper lines. In a case where the signal line includes copper, for example, the signal line may be formed by a multilayer structure in which copper and titanium are stacked, or a multilayer structure in which copper, titanium and silicon are stacked. The titanium included in the signal line may be replaced with, for example, molybdenum, tungsten, or other high-melting-point metal.

In the case where the active element 91, 92 is a thin-film transistor of an oxide semiconductor with a channel layer which is transparent in a visible range, the line width of the pattern of the light-shield layer, such as the black matrix BM, can be reduced, and the brightness of the liquid crystal display device 30 can be enhanced. In the case where the thin-film transistor of the oxide semiconductor is used in the liquid crystal display device 30, optical alignment can efficiently be performed and the reliability of the liquid crystal display device 30 can be enhanced. In a conventional PSA technique using a liquid crystal to which a photopolymerizable monomer is added, there is a case in which the reliability of the liquid crystal display device is degraded by a residual non-polymerized monomer or an insufficiently cured optical alignment film due to ultraviolet shielding by the light-shield portion of the thin-film transistor that occupies a large area relating to the silicon semiconductor or the black matrix BM which partitions colored pixels, or the color filter with poor ultraviolet transmittance. However, as in the embodiment, by using the thin-film transistor of the oxide semiconductor, it is possible to decrease the area of the light-shield portion, to perform exposure on a wide area, and to greatly enhance the reliability. Compared to this thin-film transistor of the oxide semiconductor, a thin-film transistor of a silicon semiconductor has sensitivity to light in a visible range, and it is thus necessary to light-shield the thin-film transistor with a larger area by a light-shield layer such as a black matrix BM.

As the oxide semiconductor, composite metal oxides which are transparent in the visible range are applicable. A semiconductor material including these metal oxides as components is an oxide including two or more elements of zinc, indium, tin, tungsten, magnesium, and gallium. As materials, for instance, use may be made of zinc oxide, indium oxide, indium-zinc-oxide, tin oxide, tungsten oxide (WO), indium-gallium-zinc-oxide (In—Ga—Zn—O), indium-gallium-oxide (In—Ga—O), zinc-tin-oxide (Zn—Sn—O), or zinc-tin-silicon-oxide (Zn—Sn—Si—O), or other materials. These materials are substantially transparent, and the band gap should preferably be 2.8 eV or more, and should more preferably be 3.2 eV or more. The structure of these materials may be any one of a single crystal, a polycrystal, a microcrystal, a mixed crystal of a crystalline/amorphous structure, a nanocrystal-dispersed amorphous structure, and an amorphous structure. It is desirable that the film thickness of an oxide semiconductor layer be 10 nm or more. The oxide semiconductor layer is formed by using a method such as a sputtering method, a pulse laser deposition method, a vacuum evaporation method, a CVD (Chemical Vapor Deposition) method, an MBE (Molecular Beam Epitaxy) method, an ink jet method, or a print method. Preferably, the oxide semiconductor layer is formed by the sputtering method, pulse laser deposition method, vacuum evaporation method, ink jet method, or print method. As regards the sputtering method, an RF magnetron sputtering method or a DC sputtering method is usable, but, more preferably, the DC sputtering method is used. As a starting material (target material) for sputtering, an oxide ceramic material or a metallic target material can be used. As regards the vacuum evaporation, heating evaporation, electron beam evaporation, and an ion plating method can be used. As the print method, transfer printing, flexography, gravure printing, and gravure offset printing are usable, but other methods may be used. As the CVD method, a hotwire CVD method and plasma CVD are usable. Furthermore, other methods may be used, such as a method in which a hydrate of an inorganic salt (e.g. chloride) is dissolved in alcohol, etc., and baked and sintered, thereby forming an oxide semiconductor.

Next, a description is given of the structures of the thin-film transistor of the oxide semiconductor and the array substrate 6. As illustrated in FIG. 16, in the array substrate 6, insulation layers 20a, 20b, common electrodes 211, 212, an insulation layer 20c, pixel electrodes 221, 222, and an alignment sustaining layer 252 are formed in the named order on a transparent substrate (e.g. glass substrate) 19. The array substrate 6 includes active elements 14a, 14b for applying a liquid crystal driving voltage to the pixel electrodes 221, 222, and gate lines and source lines which are electrically connected to the active elements 14a 14b.

The active element 14a, 14b has, for example, a bottom-gate-type top contact etch stopper structure. Alternatively, the active element 14a, 14b may have, for example, a bottom-gate-type top contact structure excluding an etch stopper, or a back channel structure. The transistor structure is not limited to the bottom gate structure, and may be a top gate structure, a double gate structure, or a dual gate structure.

In the manufacture of the active element 14a, 14b, to begin with, an ITO thin film of 140 nm is formed by a DC magnetron sputtering method. Then, the ITO thin film is patterned in a desired shape, and a gate electrode and an auxiliary capacitor electrode are formed. Further, a $SiH_x$ thin film of 350 nm is formed thereon by using a plasma CVD method, with use of $SiH_4$, $NH_3$ and $H_2$ as a material gas, and thus a gate insulation film that is a transparent insulation film is formed. In addition, as a channel layer, an amorphous In—Ga—Zn—O thin film of 40 nm is formed by a DC sputtering method by using an $InGaZnO_4$ target, and the amorphous In—Ga—Zn—O thin film is pattered in a desired shape, and thus a transparent channel layer is formed. Further, an SiON thin film is formed by an RF sputtering method by using a $Si_3H_4$ target while introducing Ar and $O_2$, and the SiON thin film is patterned in a desired shape, and thus a channel protection layer is formed. Furthermore, an ITO thin film of 140 nm is formed by a DC magnetron sputtering method and is patterned in a desired shape, and a source/drain electrode is formed.

In the liquid crystal display device 30 according to the above-described embodiment, rising of liquid crystal molecules L1 to L8 can be suppressed, and the same advantageous effects as with the liquid crystal display device 1 according to the above-described first embodiment can be obtained.

Third Embodiment

In the present embodiment, transparent resins and organic pigments, which are used for the color filter substrates 5, 28 according to the above-described first and second embodiments, will be exemplarily described.

(Transparent Resins)

A photosensitive color composition, which is used for forming the black matrix BM and color filter 16, includes, in addition to a pigment-dispersed body, a multifunctional monomer, a photosensitive resin or a nonphotosensitive resin, a polymerization initiator, and a solvent. Organic resins with high transparency which can be used in the present embodiment, for instance, a photosensitive resin or a nonphotosensitive resin, are generally referred to as transparent resins.

As the transparent resins, use can be made of thermoplastic resins, thermosetting resins, or photosensitive resins. As the thermoplastic resins, for example, use can be made of a butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene resin, polyamide resin, rubber resin, cyclized rubber resin, celluloses, polybutadiene, polyethylene, polypropylene, and polyimide. In addition, as the thermosetting resins, for example, use can be made of an epoxy resin, benzoguanamine resin, rosin-modified maleic acid resin, rosin-modified fumaric acid resin, melamine resin, urea resin, and phenol resin. The thermosetting resin may be produced by a reaction between a melamine resin and a compound including an isocyanate group.

(Alkali-Soluble Resins)

For the formation of the light-shield pattern such as the black matrix BM, the transparent pattern and the color filter, which are used in the present embodiment, it is preferable to use photosensitive resin compositions which are capable of patterning by photolithography. It is desirable that these transparent resins be resins to which alkali-solubility is imparted. As the alkali-soluble resins, resins including a carboxyl group or a hydroxyl group may be used, or other resins may be used. As the alkali-soluble resins, for example, use can be made of an epoxy acrylate resin, novolak resin, polyvinylphenol resin, acrylic resin, carboxyl group-containing epoxy resin, and carboxyl group-containing urethane resin. Of these, the epoxy acrylate resin, novolak resin and acrylic resin should preferably be used as the alkali-soluble resins, and, in particular, the epoxy acrylate resin and novolak resin are preferable.

(Acrylic Resins)

As typical transparent resins which are applicable in the embodiment, the following acrylic resins are exemplarily described.

As the acrylic resins, use can be made of polymers which are obtained by using, as monomers, for instance, (meth) acrylic acid; alkyl(meth)acrylate such as methyl(meth)acrylate, ethyl(meth)acrylate, propyl(meth)acrylate, butyl(meth)acrylate, t-buthyl(meth)acrylate, benzyl(meth)acrylate, or lauryl(meth)acrylate; hydroxyl group-containing (meth) acrylate such as hydroxyethyl(meth)acrylate or hydroxypropyl(meth)acrylate; ether group-containing (meth)acrylate such as ethoxyethyl(meth)acrylate or glycidyl(meth)acrylate; and alicyclic(meth)acrylate such as cyclohexyl(meth) acrylate, isobornyl(meth)acrylate, or dicyclopentenyl(meth) acrylate.

Incidentally, the monomers described above by way of example can be used singly or in combination of two or more kinds. Further, the acrylic resin may be produced by using a copolymer by a compound, such as styrene, cyclohexyl maleimide, or phenyl maleimide, which is copolymerizable with these monomers.

In addition, for example, a resin with photosensitivity may be produced by a reaction between a copolymer obtained by copolymerizing carboxylic acid having an ethylenic unsaturated group such as (meth)acrylic acid, and a compound including an epoxy group and an unsaturated double bond, such as glycidyl methacrylate. For example, a resin with photosensitivity may be produced by adding a carboxylic acid-containing compound, such as (meth)acrylic acid, to a polymer of epoxy group-containing (meth)acrylate, such as glycidyl methacrylate, or a copolymer between this polymer and other (meth)acrylate.

(Organic Pigments)

As red pigments, for example, use can be made of C. I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, and 279.

As yellow pigments, for example, use can be made of C. I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214.

As blue pigments, for example, use can be made of C. I. Pigment Blue 15, 15:1, 15:2, 15:3, 15:4, 15:6, 16, 22, 60, 64, and 80. Of these, C. I. Pigment Blue 15:6 is preferable.

As violet pigments, for example, use can be made of C. I. Pigment Violet 1, 19, 23, 27, 29, 30, 32, 37, 40, 42, and 50. Of these, C. I. Pigment Violet 23 is preferable.

As green pigments, for example, use can be made of C. I. Pigment Green 1, 2, 4, 7, 8, 10, 13, 14, 15, 17, 18, 19, 26, 36, 45, 48, 50, 51, 54, 55, and 58. Of these, C. I. Pigment Green 58, which is a halogenated zinc phthalocyanine green pigment, is preferable.

(Color Materials of Black Matrix BM)

A light-shielding color material included in the layer of the black matrix BM is a color material which exhibits a light-shield function by having absorption in a visible light wavelength range. In the embodiment, as the light-shielding color materials, for example, organic pigments, inorganic pigments, and dyes are usable. As the inorganic pigments, for example, carbon black and titanium oxide can be used. As the dyes, for example, an azoic dye, anthraquinone dye, phthalocyanine dye, quinonimine dye, quinoline dye, nitro dye, carbonyl dye, and methine dye are usable. As regards the organic pigments, the above-described organic pigments can be adopted. Incidentally, a light-shielding component may be one kind, or a combination of two or more kinds with a proper ratio. In addition, a volume resistance may be increased by resin coating on the surface of these color materials, or, conversely, the volume resistance may be decreased by imparting a slight electrical conductivity by increasing the content ratio of the color material to the base material of the resin. However, since the volume resistance value of such light-shield material is in a range of about $1 \times 10^8 \sim 1 \times 10^{15}$ $\Omega \cdot$cm, this is not such a level as to affect the resistance value of the transparent conductive film. Similarly, the specific dielectric constant of the light-shield layer can be adjusted in a range of about 3 to 30 by the selection or content ratio of the color material. The specific dielectric constants of the coating film of the black matrix BM, the coating film of the color pixel and the transparent resin layer can be adjusted within the above-described range of the specific dielectric constant, in accordance with the design conditions and liquid crystal driving conditions of the liquid crystal display device 1, 30.

In the present embodiment, there is no need to form a large light-shield part in a case of using a silicon-based thin-film transistor, such as an amorphous silicon-based thin-film transistor. It is possible to eliminate moiré due to non-uniformity of a black matrix pattern within a pixel at a time of using a silicon-based thin-film transistor, and due to an alignment defect relative to the optical control element 101, 102.

The above-described embodiments may be variously altered and applied without departing from the spirit of the invention. The above embodiments may be freely combined and used.

What is claimed is:

1. A liquid crystal display device comprising:
    an array substrate including a plurality of pixel electrodes corresponding to a plurality of pixels arranged in a matrix;
    a color filter substrate opposed to the array substrate and including color filters corresponding to the plurality of pixels;
    a liquid crystal layer provided between the array substrate and the color filter substrate;
    a backlight unit provided on a back surface side of the array substrate, the back surface side being opposite to a liquid crystal layer side of the array substrate;
    a controller configured to control an application timing of a liquid crystal driving voltage to the pixel electrodes, and a light emission timing of the backlight unit; and
    a light reception element configured to detect light incident from an observer side,
    wherein the plurality of pixels are configured to each have a plan-view shape of a parallelogram which is elongated in a lateral direction, and configured such that identical colors are arranged in the lateral direction, and different colors are arranged in a vertical direction, pixels neighboring in the lateral direction of the plurality of pixels have shapes of line-symmetry with respect to a center line of the pixels neighboring in the lateral direction, the plurality of pixels include a picture element composed of two red pixels that are neighboring in the lateral direction, two green pixels that are neighboring in the lateral direction, and two blue pixels that are neighboring in the lateral direction, the plurality of pixels are parallelogrammatic with a long side having an angle $\gamma$ to the lateral direction, and a short side parallel to the vertical direction, two pixels neighboring in the lateral direction are of the same color and have a V shape or an inverted-V shape, and a pattern of the V shape or the inverted-V shape is repeated in the lateral direction, the color filter substrate includes a black matrix which partitions the pixels, the backlight unit is an edge-lit-type unit including a solid-state light-emission element array, the controller is configured to execute, based on a video signal, synchronization control between the application timing of the liquid crystal driving voltage to the pixel electrodes, and the light emission timing of the backlight unit, the controller is configured to apply a voltage to one or two of the pixel electrodes corresponding to the pixels neighboring in the lateral direction to switch between a three-dimensional image display and a two-dimensional image display, the black matrix is formed between pixels neighboring in the vertical direction and is not formed between pixels neighboring in the lateral direction, liquid crystal molecules of the pixels neighboring in the lateral direction have a negative dielectric constant anisotropy, and, when the liquid crystal driving voltage is applied to the pixel electrodes corresponding to the pixels neighboring in the lateral direction, the liquid crystal molecules rotate horizontally relative to a substrate plane in a direction of the line-symmetry with respect to the center line, and the controller is configured to detect a position of the observer based on data measured by the light reception element and to adjust an emission angle of light emitted by the backlight unit based on the detected position of the observer.

2. The liquid crystal display device of claim 1, further comprising a plurality of active elements which are electrically connected to the plurality of pixel electrodes and are formed of an oxide semiconductor using a composite metal oxide as a transparent channel material.

3. The liquid crystal display device of claim 1, wherein the pixel electrode includes a plurality of comb-tooth portions each having a longitudinal direction parallel to a long side of the pixel, and has a comb shape of line-symmetry with respect to the center line of the neighboring pixels.

4. The liquid crystal display device of claim 1, wherein the color filter substrate includes a transparent electrode film and the color filters on a transparent substrate.

5. The liquid crystal display device of claim 1, wherein the color filter substrate includes the black matrix, a transparent electrode film and the color filters on a transparent substrate.

6. The liquid crystal display device of claim 1, further comprising an optical control element disposed between the array substrate and the backlight unit and including an array of a plurality of triangular prisms and an array of a plurality of semicylindrical lenses, wherein a predetermined angle is provided between a longitudinal direction of the plurality of triangular prisms and a longitudinal direction of the plurality of semicylindrical lenses.

7. The liquid crystal display device of claim 1, further comprising an optical control element disposed between the array substrate and the backlight unit and including an array of a plurality of triangular prisms and an array of a plurality of semicylindrical lenses, wherein a longitudinal direction of the plurality of triangular prisms is parallel to a longitudinal direction of the plurality of semicylindrical lenses, and a width of the triangular prism is double a length of the pixel in the lateral direction.

8. The liquid crystal display device of claim 7, wherein a width of the semicylindrical lens is an integer number of times of a width of two pixels in the lateral direction.

* * * * *